(12) United States Patent
Hayashi et al.

(10) Patent No.: US 8,625,317 B2
(45) Date of Patent: Jan. 7, 2014

(54) ISOLATED SWITCH-MODE POWER SUPPLY DEVICE

(75) Inventors: Masaaki Hayashi, Saitama (JP);
Hiroshi Narisawa, Saitama (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 66 days.

(21) Appl. No.: 13/509,749

(22) PCT Filed: Jul. 13, 2011

(86) PCT No.: PCT/JP2011/004019
§ 371 (c)(1),
(2), (4) Date: May 14, 2012

(87) PCT Pub. No.: WO2012/008157
PCT Pub. Date: Jan. 19, 2012

(65) Prior Publication Data
US 2012/0281440 A1    Nov. 8, 2012

(30) Foreign Application Priority Data

Jul. 14, 2010  (JP) ................................ 2010-159483

(51) Int. Cl.
*H02M 1/36* (2007.01)
(52) U.S. Cl.
USPC ............... 363/97; 363/49; 323/271; 323/284; 323/908
(58) Field of Classification Search
USPC ................. 323/238, 271, 282–285, 901, 908; 363/18–21.18, 49, 97
See application file for complete search history.

(56) References Cited

U.S. PATENT DOCUMENTS

| | | | |
|---|---|---|---|
| 6,856,519 B2 * | 2/2005 | Lin et al. | 363/16 |
| 7,667,445 B2 * | 2/2010 | Hiasa | 323/284 |
| 7,746,672 B2 * | 6/2010 | Nishikawa | 363/21.16 |
| 8,018,208 B1 * | 9/2011 | Kahn et al. | 323/224 |
| 2004/0042239 A1 | 3/2004 | Kitano | |

OTHER PUBLICATIONS

International Search Report for PCT Application No. PCT/JP2011/004019 dated Oct. 18, 2011, pp. 1-4.

* cited by examiner

*Primary Examiner* — Jessica Han

(57) ABSTRACT

The present invention provides an isolated switch-mode power supply device capable of sufficiently reducing power consumption in a standby mode. An isolated switch-mode power supply device includes: a capacitor that supplies control power for controlling switching of a switching element; a first control unit that includes a constant current supplying unit that controls switching of the switching element; a switching element that connects or disconnects the first control unit and the capacitor; a capacitance element unit having a capacitor to which a constant current is supplied from the constant current supplying unit, a capacitor charge voltage of the capacitance element unit changing according to an outputted voltage in the standby mode; and a second control unit that controls power supply to the first control unit by closing or opening the switching element during a switching pause period in the standby mode according to the capacitor charge voltage of the capacitor.

18 Claims, 12 Drawing Sheets

ISOLATED SWITCH-MODE POWER SUPPLY DEVICE

CROSS-REFERENCE TO RELATED APPLICATIONS

This application is International Application No. PCT/JP2011/004019, filed Jul. 13, 2011, which claims priority from Japanese Patent Application No. 2010-159483, filed Jul. 14, 2010.

TECHNICAL FIELD

The present invention relates to isolated switch-mode power supply devices, and in particular, to an isolated switch-mode power supply device capable of reducing power consumption in a standby mode.

BACKGROUND ART

Conventionally, an isolated switch-mode power supply device converts an inputted voltage into a desired voltage by switching a switching element and outputs the desired voltage. Such an isolated switch-mode power supply device employs a technique of burst-controlling the switching element in a standby mode in order to reduce power consumption in the standby mode. According to this technique, in the standby mode, an oscillation period in which switching of the switching element is performed at a predetermined cycle and a switching pause period in which the switching of the switching element is temporarily stopped are repeated. As this reduces the number of switching per unit time, it is possible to reduce a switching loss per unit time, and as a result, power consumption in the standby mode can be reduced.

Further, various techniques have been proposed as a technique of further reducing power consumption in the standby mode (see Japanese Unexamined Patent Application Publication Nos. 2002-58238, 2002-58238 and 2000-270544, and Japanese Unexamined Utility Model Application Publication No. H03-113986, for example).

Japanese Unexamined Patent Application Publication No. 2002-58238 discloses a technique of, in the standby mode, stopping the switching of the switching element when the outputted voltage is higher than an upper limit voltage, and starting the switching of the switching element when the outputted voltage is lower than a lower limit voltage. According to this technique, it is possible to increase a bursting cycle by increasing output ripples, and thus, power consumption in the standby mode can be further reduced.

However, according to the technique disclosed in Japanese Unexamined Patent Application Publication No. 2002-58238, during the switching pause period in the standby mode, control power is kept supplied to circuits and elements for controlling driving of the switching element. Accordingly, a power loss occurs in these circuits and elements even during the switching pause period in the standby mode.

By contrast, Japanese Unexamined Patent Application Publication No. 2004-88959 discloses a technique of, in an isolated switch-mode power supply device, providing a switch circuit along a line for supplying control power to the circuits and the elements, and of stopping supplying control power to the circuits and the elements during the switching pause period in the standby mode. According to this technique, it is possible to prevent a power loss from occurring in the circuits and the elements during the switching pause period in the standby mode.

Further, Japanese Unexamined Utility Model Application Publication No. H03-113986 discloses a technique of providing switching means for turning on and off the supply of the control power to the circuits and the elements, and of causing the switching means to turn off the supply of the control power when the outputted voltage exceeds a predetermined value that has been preliminarily determined. According to this technique, it is possible to prevent a power loss from occurring in the circuits and the elements when the outputted voltage exceeds the predetermined value. Here, as the outputted voltage increases during the oscillation period in the standby mode, switching to the switching pause period when the outputted voltage exceeds the predetermined value that has been preliminarily determined can prevent a power loss from occurring in the circuits and the elements during the switching pause period in the standby mode.

Moreover, Japanese Unexamined Patent Application Publication No. 2000-270544 discloses a technique of, in an isolated switch-mode power supply device, providing control power to the circuits and the elements by a startup circuit in which a starting resistance and the switch circuit are connected in series. When the outputted voltage is higher than the upper limit voltage in the standby mode, the isolated switch-mode power supply device stops the switching of the switching element and turns the switch circuit to the OFF state to stop the startup circuit. By contrast, when the outputted voltage is lower than the lower limit voltage in the standby mode, the isolated switch-mode power supply device turns the switch circuit to the ON state and operates the startup circuit, thereby starting the switching of the switching element. According to such an isolated switch-mode power supply device, it is possible to prevent a power loss from occurring due to the starting resistance during the switching pause period in the standby mode.

BRIEF SUMMARY OF THE INVENTION

According to the technique disclosed in Patent Literature 2, as described above, during the switching pause period in the standby mode, the supply of the control power to the circuits and the elements for controlling driving of the switching element is stopped. Accordingly, the outputted voltage decreases over time as the switching of the switching element is stopped during the switching pause period in the standby mode. Therefore, a primary-side circuit is provided with a differential amplifier for determining a signal level of an outputted voltage detection signal transmitted from a secondary-side circuit to detect whether or not the outputted voltage has decreased down to a preliminarily determined lower limit voltage. According to the isolated switch-mode power supply device disclosed in Patent Literature 2, as shown in FIG. 3 of Patent Literature 2, for example, when the outputted voltage decreases down to the lower limit voltage, the primary-side circuit again starts supplying control power to the circuits and the elements to resume the switching of the switching.

Specifically, according to the technique disclosed in Patent Literature 2, it is required for the primary-side circuit to keep operating the differential amplifier in order to stably control the lower limit voltage of the outputted voltage during the switching pause period in the standby mode, and thus the primary-side circuit has to keep supplying current to the differential amplifier. As the power consumption of the differential amplifier is large, it is not possible to sufficiently reduce power consumption of the isolated switch-mode power supply device during the switching pause period in the standby mode. Accordingly, it has been extremely difficult to sufficiently reduce power consumption of the isolated switch-mode power supply device while stably controlling the lower limit voltage of the outputted voltage.

Likewise, according to the technique disclosed in Patent Literature 4, the startup circuit is operated during the oscillation period in the standby mode while the startup circuit stops during the switching pause period in the standby mode, and therefore it has not been possible to sufficiently reduce power consumption in the standby mode.

It should be noted that a method of stopping the supply of control power to all of the elements and the circuits relating to the switching of the switching element including the differential amplifier described above during the switching pause period in the standby mode is conceivable.

In this case, when attempting to stop the supply of control power by switching according to the techniques disclosed in Patent Literature 2 and such, electric power is necessary to maintain the switch to the OFF state during a period in which the supply of control power is stopped. Accordingly, with the techniques disclosed in Patent Literatures 2-4, it is not possible to stop the supply of control power to all of the elements and the circuits described above.

By contrast, a method of making a control voltage supplied to the circuits and the elements for controlling driving of the switching element to 0 V is conceivable. According to this method, the switch for stopping the supply of control power is not required, and it is possible to stop the supply of control power to all of the elements and the circuits described above without supplying control power to maintain the switch to the OFF state. However, when shifting from the switching pause period to the oscillation period in the standby mode, it is necessary to operate the startup circuit in order to quickly increase the control voltage from 0 V to a predetermined level. Accordingly, electric power is consumed by the startup circuit every time when shifting from the switching pause period to the oscillation period in the standby mode.

Consequently, even when the supply of control power to all of the elements and the circuits relating to the switching of the switching element is stopped during the switching pause period in the standby mode, an object of sufficiently reducing power consumption may not be achieved.

In view of the above problems, an object of the present invention is to provide an isolated switch-mode power supply device capable of sufficiently reducing power consumption in a standby mode.

In order to address the above problems, the present invention proposes the following solutions. (1) The present invention proposes an isolated switch-mode power supply device (for example, corresponding to an isolated switch-mode power supply device 1 in FIG. 1) capable of controlling switching of a switching element (for example, corresponding to a switching element Q1 in FIG. 1) in one of a continuous operation (for example, corresponding to a continuous operation that will be later described) and a burst mode operation (for example, corresponding to a standby mode that will be later described), and of controlling conversion of an inputted voltage into a required outputted voltage. The isolated switch-mode power supply device is provided with: a control power supply source (for example, corresponding to a capacitor C5 in FIG. 1) configured to supply control power required for controlling the switching; a first control unit (for example, corresponding to a first control unit 10 in FIG. 3) having a current supplying unit (for example, corresponding to a constant current supplying unit 14 in FIG. 3) for supplying a preliminarily determined current during at least a part (for example, corresponding to a time period from time t6 to time t8 in FIG. 12) of a time period in which power supply is received from the control power supply source (for example, corresponding to a time period from time t4 to time t8 in FIG. 12), and configured to control the switching of the switching element in one of the continuous operation and the burst mode operation; a control power supply switch (for example, corresponding to a switching element Q11 in FIG. 4) configured to either connect or disconnect the first control unit and the control power supply source; a capacitance element unit (for example, corresponding to a capacitance element unit 121 in FIG. 5) having a first capacitor (for example, corresponding to a capacitor C4 in FIG. 5) to which the current is supplied from the current supplying unit, a capacitor charge voltage of the first capacitor changing according to an outputted voltage in the burst mode operation; and a second control unit (for example, corresponding to a second control unit 12 in FIG. 3) configured to control the power supply to the first control unit by opening the control power supply switch during at least a part (for example, corresponding to a time period from time t3 to time t4 in FIG. 12) of a switching pause period (for example, corresponding to a time period from time t2 to time t4 in FIG. 12) in the burst mode operation according to the capacitor charge voltage of the first capacitor (for example, corresponding to a voltage $V_{C4}$ in FIG. 12).

According to this invention, the isolated switch-mode power supply device is provided with the control power supply source, the first control unit, the control power supply switch, and the second control unit. Further, the control power supply source supplies the control power required for controlling the switching, the first control unit controls the switching of the switching element, and the control power supply switch connects or disconnects the first control unit and the control power supply source. Moreover, the second control unit controls the power supply to the first control unit by opening the control power supply switch during at least a part of the switching pause period in the burst mode operation. Accordingly, during the time period in which the control power supply switch is opened in the switching pause period in the burst mode operation, it is possible to stop the power supply from the control power supply source to the first control unit. Therefore, power consumption of the isolated switch-mode power supply device in the burst mode operation can be reduced.

Further, according to this invention, the first control unit is provided with the current supplying unit for supplying the preliminarily determined current to the first capacitor during at least a part of the time period in which the power supply is received from the control power supply source. In addition, the second control unit controls the power supply to the first control unit as described above according to the capacitor charge voltage of the first capacitor. Accordingly, the supply of the current from the current supplying unit to the first capacitor can be performed within the time period in which the first control unit receives the power supply from the control power supply source. Therefore, it is possible to incorporate the current supplying unit in the first control unit, and the power consumption of the isolated switch-mode power supply device in the burst mode operation can be further reduced.

Moreover, according to this invention, as described above, the isolated switch-mode power supply device is provided with the control power supply source, the first control unit, the control power supply switch, the capacitance element unit, and the second control unit. Accordingly, during the time period in which the control power supply switch is opened in the switching pause period in the burst mode operation, it is possible to stop the power supply from the control power supply source to the first control unit. Therefore, the power consumption of the isolated switch-mode power supply device can be reduced without making the control voltage 0 V during the switching pause period in the burst mode operation. Thus, as it is not necessary to operate the startup circuit when shifting from the switching pause period to a switching time period in the burst mode operation, the power consumption of the isolated switch-mode power supply device can be sufficiently reduced.

(2) In the above isolated switch-mode power supply device, the current supplying unit may change a value of the current to be supplied to the first capacitor according to the capacitor charge voltage of the first capacitor.

In such case, it is possible to supply the first capacitor with a large current only when it is necessary to increase the capacitor charge voltage of the first capacitor. With this, it is possible to reduce a loss when it is not necessary to increase the capacitor charge voltage of the first capacitor, and to quickly charge the first capacitor when it is necessary to increase the capacitor charge voltage of the first capacitor. Therefore, a proportion of a time period during which the power supply to the first control unit is performed to an intermittent oscillation cycle can be made small, and the power consumption of the isolated switch-mode power supply device in the burst mode operation can be further reduced.

(3) In the above isolated switch-mode power supply device, when the capacitor charge voltage of the first capacitor is no lower than a second set voltage (for example, corresponding to a voltage Vth3 in FIG. 12) and the outputted voltage is no lower than an upper limit voltage, the first control unit may stop the switching of the switching element.

In such case, the oscillation can be stopped immediately when the outputted voltage reaches the upper limit voltage, and therefore it is possible to decrease a proportion of the oscillation period to the intermittent oscillation cycle, that is, an oscillation duty of the intermittent oscillation, as well as a number of oscillation times of the switching element per unit time. Therefore, the power consumption of the isolated switch-mode power supply device in the burst mode operation can be further reduced.

(4) In the above isolated switch-mode power supply device, when the outputted voltage becomes no lower than the upper limit voltage during the time period in which the power supply from the control power supply source to the first control unit is performed, the current supplying unit may start supplying the current to the first capacitor, and when the capacitor charge voltage of the first capacitor is no lower than a second set voltage (for example, corresponding to the voltage Vth3 in FIG. 12) and the outputted voltage is no lower than the upper limit voltage, the first control unit may stop the switching of the switching element.

In such case, even during the time period in which the power supply from the control power supply source to the first control unit is performed, the first capacitor may not be charged unless the outputted voltage increases up to the upper limit voltage. Therefore, it is possible to charge the first capacitor after the outputted voltage is acquired to some extent, and to prevent an erroneous operation from occurring.

(5) The present invention proposes an isolated switch-mode power supply device (for example, corresponding to an isolated switch-mode power supply device 1 in FIG. 1) capable of controlling switching of a switching element (for example, corresponding to a switching element Q1 in FIG. 1) in one of a continuous operation (for example, corresponding to a normal mode that will be later described) and a burst mode operation (for example, corresponding to a standby mode that will be later described), and of controlling conversion of an inputted voltage into a required outputted voltage. The isolated switch-mode power supply device is provided with: a control power supply source (for example, corresponding to a capacitor C5 in FIG. 1) configured to supply control power required for controlling the switching; a first control unit (for example, corresponding to a first control unit 10 in FIG. 3) having a constant current supplying unit (for example, corresponding to a constant current supplying unit 14 in FIG. 3) for supplying a preliminarily determined constant current during at least a part (for example, corresponding to a time period from time t6 to time t8 in FIG. 12) of a time period in which power supply is received from the control power supply source (for example, corresponding to a time period from time t4 to time t8 in FIG. 12), and configured to control the switching of the switching element in one of the continuous operation and the burst mode operation; a control power supply switch (for example, corresponding to a switching element Q11 in FIG. 4) configured to either connect or disconnect the first control unit and the control power supply source; a capacitance element unit (for example, corresponding to a capacitance element unit 121 in FIG. 5) having a first capacitor (for example, corresponding to a capacitor C4 in FIG. 5) to which the constant current is supplied from the constant current supplying unit, a capacitor charge voltage of the first capacitor changing according to an outputted voltage in the burst mode operation; and a second control unit (for example, corresponding to a second control unit 12 in FIG. 3) configured to control the power supply to the first control unit by opening the control power supply switch during at least a part (for example, corresponding to a time period from time t3 to time t4 in FIG. 12) of a switching pause period (for example, corresponding to a time period from time t2 to time t4 in FIG. 12) in the burst mode operation according to the capacitor charge voltage of the first capacitor (for example, corresponding to a voltage $V_{C4}$ in FIG. 12).

According to this invention, the isolated switch-mode power supply device is provided with the control power supply source, the first control unit, the control power supply switch, and the second control unit. Further, the control power supply source supplies the control power required for controlling the switching, the first control unit controls the switching of the switching element, and the control power supply switch connects or disconnects the first control unit and the control power supply source. Moreover, the second control unit controls the power supply to the first control unit by opening the control power supply switch during at least a part of the switching pause period in the burst mode operation. Accordingly, during the time period in which the control power supply switch is opened in the switching pause period in the burst mode operation, it is possible to stop the power supply from the control power supply source to the first control unit. Therefore, power consumption of the isolated switch-mode power supply device in the burst mode operation can be reduced.

Further, according to this invention, the first control unit is provided with the constant current supplying unit for supplying the preliminarily determined constant current to the first capacitor during at least a part of the time period in which the power supply is received from the control power supply source. In addition, the second control unit controls the power supply to the first control unit as described above according to the capacitor charge voltage of the first capacitor. Accordingly, the supply of the constant current from the constant current supplying unit to the first capacitor can be performed within the time period in which the first control unit receives the power supply from the control power supply source. Therefore, it is possible to incorporate the constant current supplying unit in the first control unit, and the power consumption of the isolated switch-mode power supply device in the burst mode operation can be further reduced.

Moreover, according to this invention, as described above, the isolated switch-mode power supply device is provided with the control power supply source, the first control unit, the control power supply switch, the capacitance element unit, and the second control unit. Accordingly, during the time period in which the control power supply switch is opened in the switching pause period in the burst mode operation, it is possible to stop the power supply from the control power supply source to the first control unit. Therefore, the power consumption of the isolated switch-mode power supply device can be reduced without making the control voltage 0 V during the switching pause period in the burst mode operation. Thus, as it is not necessary to operate the startup circuit when shifting from the switching pause period to a switching time period in the burst mode operation, the power consumption of the isolated switch-mode power supply device can be sufficiently reduced.

(6) In the above isolated switch-mode power supply device the constant current supplying unit may change a value of the constant current to be supplied to the first capacitor according to the capacitor charge voltage of the first capacitor.

In such case, it is possible to supply the first capacitor with a large current only when it is necessary to increase the capacitor charge voltage of the first capacitor. With this, it is possible to reduce a loss when it is not necessary to increase the capacitor charge voltage of the first capacitor, and to quickly charge the first capacitor when it is necessary to increase the capacitor charge voltage of the first capacitor. Therefore, a proportion of a time period during which the power supply to the first control unit is performed to the intermittent oscillation cycle can be made small, and the power consumption of the isolated switch-mode power supply device in the burst mode operation can be further reduced.

(7) In the above isolated switch-mode power supply device, when the capacitor charge voltage of the first capacitor is no lower than a second set voltage (for example, corresponding to a voltage Vth3 in FIG. 12) and the outputted voltage is no lower than an upper limit voltage, the first control unit may stop the switching of the switching element.

In such case, the oscillation can be stopped immediately when the outputted voltage reaches the upper limit voltage, and therefore it is possible to decrease a proportion of the oscillation period to the intermittent oscillation cycle, that is, an oscillation duty of the intermittent oscillation, as well as a number of oscillation times of the switching element per unit time. Therefore, the power consumption of the isolated switch-mode power supply device in the burst mode operation can be further reduced.

(8) In the above isolated switch-mode power supply device, when the outputted voltage becomes no lower than the upper limit voltage during the time period in which the power supply from the control power supply source to the first control unit is performed, the constant current supplying unit may start supplying the constant current to the first capacitor, and when the capacitor charge voltage of the first capacitor is no lower than a second set voltage (for example, corresponding to the voltage Vth3 in FIG. 12) and the outputted voltage is no lower than the upper limit voltage, the first control unit may stop the switching of the switching element.

In such case, even during the time period in which the power supply from the control power supply source to the first control unit is performed, the first capacitor is not charged unless the outputted voltage increases up to the upper limit voltage. Therefore, it is possible to charge the first capacitor after the outputted voltage is acquired to some extent, and to prevent an erroneous operation from occurring.

(9) In the above isolated switch-mode power supply device the second control unit may include the capacitance element unit, the capacitance element unit may include the first capacitor, a first switching element (for example, corresponding to a switching element Q22 in FIG. 5), and a second switching element (for example, corresponding to a switching element Q24 in FIG. 5), one end of the first capacitor may be connected to a control terminal of the first switching element, the other end of the first capacitor may be connected to an output terminal of the first switching element, and to an output terminal of the second switching element, an input terminal of the first switching element may be connected to a control terminal of the second switching element, and to the control power supply source via a driving unit for driving the second switching element, (for example, corresponding to a driving unit 123 in FIG. 5), and an input terminal of the second switching element may be connected to a control terminal of the control power supply switch.

In such case, the first switching element closes or opens according to the capacitor charge voltage of the first capacitor, the second switching element opens or closes according to the state of the first switching element, and a level of the control voltage inputted to the control terminal of the control power supply switch changes according to the state of the second switching element, thereby connecting or disconnecting the first control unit and the control power supply source. Accordingly, it is possible to open the control power supply switch according to the capacitor charge voltage of the first capacitor during the switching pause period in the burst mode operation.

(10) In the above isolated switch-mode power supply device provided with first discharge means (for example, corresponding to an outputted-voltage lower-limit detecting unit 60 and a phototransistor PT1 in FIG. 1) configured to decrease the capacitor charge voltage of the first capacitor when the outputted voltage may become no higher than a lower limit voltage.

Here, as the power supply to the first control unit is stopped at least in a part of the switching pause period in the burst mode operation, the switching of the switching element is stopped, and as a result, the outputted voltage decreases.

In such case, when the outputted voltage becomes no higher than the lower limit voltage, the capacitor charge voltage of the first capacitor decreases. Therefore, by closing the control power supply switch by the second control unit that opens the control power supply switch according to the capacitor charge voltage of the first capacitor, it is possible to supply power to the first control unit and resume the switching of the switching element. Thus, by setting the lower limit voltage of the outputted voltage, it is possible to supply power to the first control unit before the outputted voltage becomes too low, and to prevent the outputted voltage from decreasing excessively.

(11) In the above isolated switch-mode power supply device, when a state switching signal for shifting the state to the continuous operation is inputted (for example, corresponding to a mode switching signal that will be later described), the first discharge means may decrease the capacitor charge voltage of the first capacitor.

In such case, the first discharge means can be commonly used between a case in which the capacitor charge voltage of the first capacitor is decreased when the outputted voltage becomes no higher than the lower limit voltage in the burst mode operation, and a case in which the capacitor charge voltage of the first capacitor is decreased when the state switching signal is inputted. Therefore, the reduction of the power consumption of the isolated switch-mode power supply device in the burst mode operation can be realized at low cost.

(12) In the above isolated switch-mode power supply device provided with a second capacitor (for example, corresponding to a capacitor C21 in FIG. 5) configured to be charged during the switching pause period in the burst mode operation, and based on a capacitor charge voltage of the second capacitor, a case in which supply of the inputted voltage is started may be discriminated from a case in which the power supply from the control power supply source to the first control unit is resumed in the burst mode operation.

Here, for the first control unit, the case in which the supply of the inputted voltage to the isolated switch-mode power supply device is started, that is, power activation of the isolated switch-mode power supply device is started and the case in which the power supply from the control power supply source to the first control unit is resumed in the burst mode operation are the same condition in that the power supply is started in a state where the power supply is not performed. Accordingly, it is difficult to discriminate the two cases from each other.

Thus, the second capacitor that is charged during the switching pause period in the burst mode operation may be provided for the isolated switch-mode power supply device. Then, based on the capacitor charge voltage of the second capacitor, the case in which the supply of the inputted voltage is started is discriminated from the case in which the power supply from the control power supply source to the first control unit is resumed in the burst mode operation. Accordingly, it is possible to identify whether the power activation to the isolated switch-mode power supply device is started or the power supply from the control power supply source to the first control unit is resumed in the burst mode operation. Therefore, when the power supply from the control power supply source to the first control unit is resumed in the burst mode operation, it is possible to perform an operation suitable for the case in which the power supply to the first control unit is resumed that is different from an operation in the case in which the power activation to the isolated switch-mode power supply device is started.

(13) In the above isolated switch-mode power supply device may be provided with second discharge means (for example, corresponding to a resistance R1 in FIG. 1) connected in parallel to the first capacitor.

Here, there is a case in which the outputted voltage decreases in an occurrence of abnormity that a peak load over an output capacity of the isolated switch-mode power supply device is caused in the burst mode operation. Accordingly, in a case in which an element or circuit for identifying whether or not the outputted voltage has become no higher than the lower limit voltage operates based on the outputted voltage, the outputted voltage may possibly fall below a voltage with which the element or circuit is operable before the first capacitor is discharged in an occurrence of abnormity as described above, and as a result, the first capacitor cannot be discharged.

Thus, in such case, even in an occurrence of abnormity as described above, it is possible to discharge the first capacitor by the second discharge means. Therefore, it is possible to resume the operation of the startup circuit and the power supply to the first control unit from the control power supply source within time determined by capacities of the second discharge means and the first capacitor and a residual voltage, and the isolated switch-mode power supply device can be restored to a normal state from an abnormal state.

(14) In the above isolated switch-mode power supply device when the capacitor charge voltage of the first capacitor becomes no lower than a first set voltage (for example, corresponding to a voltage Vth2 in FIG. 12), the second control unit may open the control power supply switch.

In such case, it is possible to increase the capacitor charge voltage of the first capacitor up to the first set voltage during the time period in which the control power supply switch is closed, that is, during the time period in which the power supply from the control power supply source to the first control unit is performed. Therefore, by setting the first set voltage, it is possible to extend the state in which the electric charge remains in the first capacitor, and in turn to extend the intermittent oscillation cycle, and as a result, the power consumption of the isolated switch-mode power supply device in the burst mode operation can be further reduced.

(15) In the above isolated switch-mode power supply device a startup circuit (for example, corresponding to a startup circuit unit 13 in FIG. 3) configured to activate the first control unit and the second control unit by the inputted voltage may be provided, and when the capacitor charge voltage of the first capacitor becomes no lower than the second set voltage, an operation of the startup circuit may be prohibited.

In such case, as the startup circuit does not operates even if the power supply to the first control unit is stopped, the power consumption of the isolated switch-mode power supply device can be further reduced without providing any special circuit for monitoring the voltage of the control power supply source and stopping the operation of the startup circuit.

(16) IN the above isolated switch-mode power supply device when the capacitor charge voltage of the first capacitor becomes lower than the second set voltage, the prohibition of the operation of the startup circuit may be lifted and the control power supply switch may be closed by the second control unit.

In such case, when the capacitor charge voltage of the first capacitor becomes lower than the second set voltage, the control power is supplied to the first control unit, and the switching of the switching element is started. Therefore, by setting the lower limit voltage of the outputted voltage and the second set voltage, it is possible to start the switching of the switching element by the first control unit before the outputted voltage becomes too low, and to prevent the outputted voltage from decreasing excessively.

Further, when the capacitor charge voltage of the first capacitor becomes lower than the second set voltage, the prohibition of the operation of the startup circuit is lifted. Here, while the capacitor charge voltage of the first capacitor decreases when the outputted voltage becomes no higher than the lower limit voltage as described above, the startup circuit becomes operable when the capacitor charge voltage of the first capacitor becomes lower than the second set voltage. Therefore, by setting the lower limit voltage of the outputted voltage and the second set voltage, the startup circuit can be operated even if the voltage of the control power supply source at which the startup circuit is required to be operated during the switching pause period in the burst mode operation, and it is possible to prevent the outputted voltage from decreasing excessively.

(17) In the above isolated switch-mode power supply device during a specific time period (for example, corresponding to a time period from time t4 to time t5 in FIG. 12) in the burst mode operation, the operation of the startup circuit may be stopped, the specific time period being a time period until a first time period (for example, corresponding to a time period determined by a time constant of a time constant circuit 122 in FIG. 5) elapses after closing the control power supply switch in an open state.

Here, as described above, it is possible to stop the power supply to the first control unit from the control power supply source at least in a part of the switching pause period in the burst mode operation. Further, as the power consumption of the second control unit is extremely small and the control voltage outputted from the control power supply source does not decrease to a large extent, the startup circuit is not normally operated. However, during a transitional time period before the voltage is stably supplied after the power supply to the first control unit is started, the startup circuit may temporarily perform an erroneous operation.

Thus, the operation of the startup circuit may be stopped during the specific time period in the burst mode operation. Here, the specific time period refers to a time period until the first time period elapses after the control power supply switch in the open state is closed. Accordingly, by setting the first time period, it is possible to prevent the startup circuit from unnecessarily operating, and the power consumption of the isolated switch-mode power supply device in the burst mode operation can be further reduced.

(18) The above isolated switch-mode power supply device may comprise a specific control unit (for example, corresponding to a low-voltage-error preventing circuit unit 15 in FIG. 3) configured to, when the control voltage supplied to the first control unit is no lower than a first threshold voltage, stop the operation of the startup circuit and start controlling the switching of the switching element, and to, when the control voltage is no higher than a second threshold voltage that is lower than the first threshold voltage, start the operation of the startup circuit and stop controlling the switching of the switching element, wherein during the specific time period in the burst mode operation, a threshold voltage used by the specific control unit is fix to the second threshold voltage.

Here, during the switching pause period in the burst mode operation, the control voltage outputted from the control power supply source often decreases due to factors such as discharge albeit gradually. Accordingly, when attempting to continue the switching pause period for over several tens of seconds, for example, the control voltage may decrease down to or below the first threshold voltage, and the startup circuit may be operated.

Thus, the isolated switch-mode power supply device is provided with the specific control unit that controls, according to the control voltage supplied to the first control unit and the threshold voltage, the operation of the startup circuit and the switching of the switching element. Specifically, the specific control unit, when the control voltage is no lower than the first threshold voltage, stops the operation of the startup circuit and starts controlling the switching of the switching element, and, when the control voltage is no higher than the second threshold voltage that is lower than the first threshold voltage, starts the operation of the startup circuit and stops controlling the switching of the switching element. Further, during the specific time period in the burst mode operation, the threshold voltage used by the specific control unit is fixed to the second threshold voltage. Accordingly, during the specific time period until the first time period elapses after closing the control power supply switch in an open state in the burst mode operation, the second threshold voltage that is lower than the first threshold voltage is used instead of the first threshold voltage. Therefore, as it is possible to immediately start the switching-control of the switching element without operating the startup circuit even if the intermittent oscillation cycle is increased, the power consumption of the isolated switch-mode power supply device can be further reduced.

Accordingly, it is possible to sufficiently reduce power consumption of an isolated switch-mode power supply device in a burst mode operation.

DETAILED DESCRIPTION OF PREFERRED EMBODIMENTS

An embodiment of the present invention will now be described with reference to the drawings. It should be noted that components in the following embodiment are replaceable with existing components as needed, and can be variously realized including combinations with existing components. Thus, the following description of this embodiment does not limit the scope of the present invention as defined in the claims.

Configuration of Isolated Switch-Mode Power Supply Device

Figure 1:
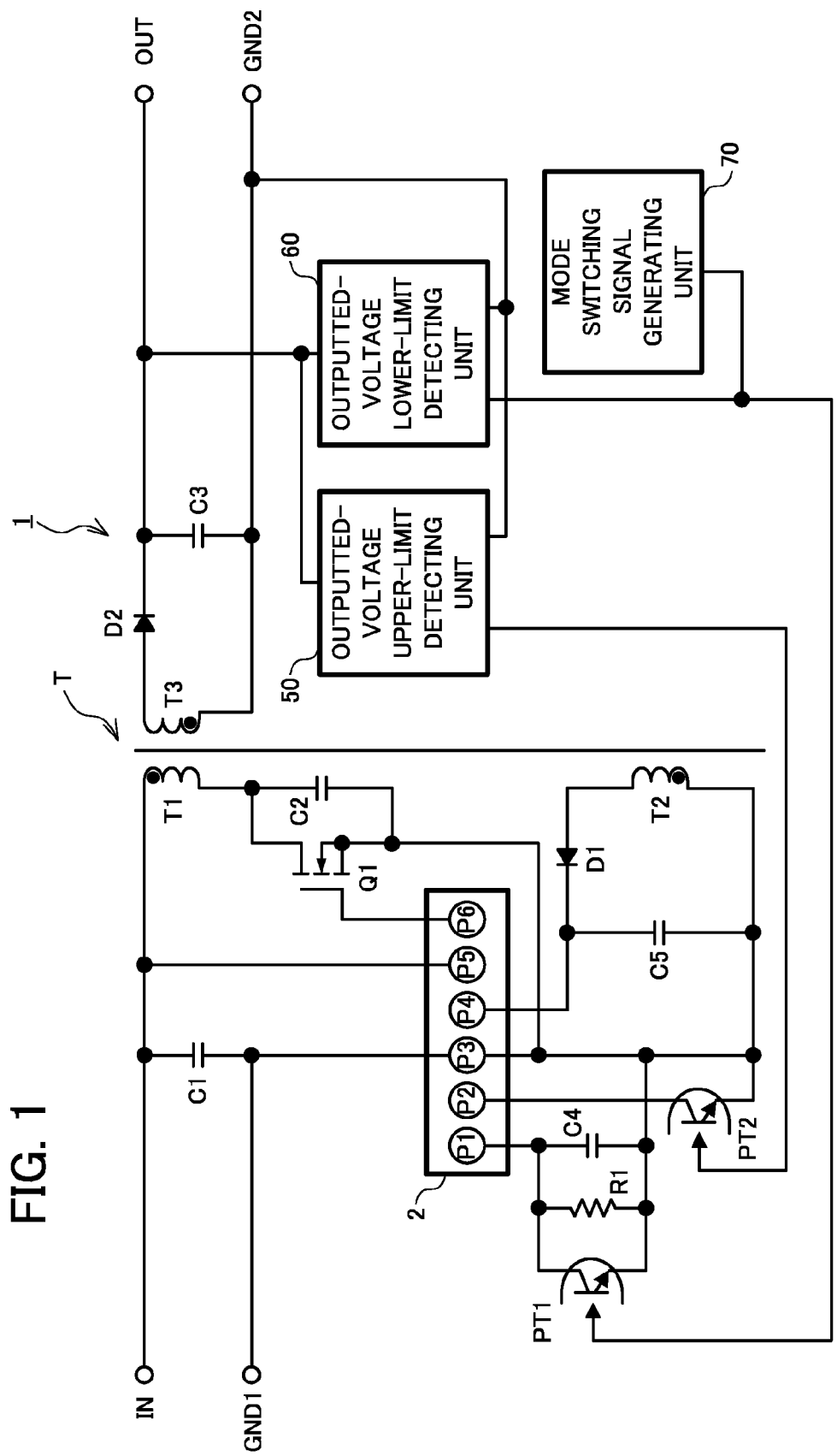
FIG. 1 is a circuit diagram of an isolated switch-mode power supply device according to one embodiment of the present invention.

FIG. 1 is a circuit diagram of an isolated switch-mode power supply device 1 according to one embodiment of the present invention. The isolated switch-mode power supply device 1 is provided with a transformer T, a control circuit 2, an outputted-voltage upper-limit detecting unit 50, an outputted-voltage lower-limit detecting unit 60, a mode switching signal generating unit 70, a switching element Q1 configured by an N-channel MOSFET, capacitors C1-C5, diodes D1 and D2, phototransistors PT1 and PT2, and a resistance R1.

First, a configuration on the primary side of the transformer T is described. The control circuit 2 is provided with six terminals P1-P6. The terminal P3 is connected to a terminal GND1 that is connected to a reference potential source, and to an input terminal IN via the capacitor C1.

The terminal P1 is connected to the terminal P3 via the capacitor C4. The capacitor C4 is connected to the resistance R1 and the phototransistor PT1 that are connected in parallel. The phototransistor PT1 is configured to be turned on and off according to signals outputted from the outputted-voltage lower-limit detecting unit 60 and the mode switching signal generating unit 70.

The terminal P2 is connected to the terminal P3 via the phototransistor PT2. The phototransistor PT2 is configured to be turned on and off according to a signal outputted from the outputted-voltage upper-limit detecting unit 50. The terminal P4 is connected to the terminal P3 via the capacitor C5, and to a cathode of the diode D1. An anode of the diode D1 is connected to the other end of a control coil T2 of the transformer T. One end of the control coil T2 is connected to the terminal P3.

The terminal P5 is connected to the input terminal IN. The input terminal IN is also connected to one end of a primary coil T1 of the transformer T. The other end of the primary coil T1 is connected to the terminal P3 via the capacitor C2. The other end of the primary coil T1 is also connected to a drain of the switching element Q1. A source of the switching element Q1 is connected to the terminal P3, and a gate of the switching element Q1 is connected to the terminal P6.

Next, a configuration on the secondary side of the transformer T is described. One end of a secondary coil T3 of the transformer T is connected to a terminal GND2 that is connected to a reference potential source. The other end of the secondary coil T3 is connected to an anode of the diode D2. A cathode of the diode D2 is connected to an output terminal OUT, and to the terminal GND2 via the capacitor C3.

The output terminal OUT is connected to the outputted-voltage upper-limit detecting unit 50 and the outputted-voltage lower-limit detecting unit 60 that are connected to the terminal GND2. The outputted-voltage upper-limit detecting unit 50 is configured to turn the phototransistor PT2 to the ON state if an outputted voltage outputted from the output terminal OUT is not lower than an upper limit voltage. The outputted-voltage lower-limit detecting unit 60 is configured to turn the phototransistor PT1 to the ON state if the outputted voltage is not higher than a lower limit voltage. In addition, the mode switching signal generating unit 70 is configured to transmit a mode switching signal to the phototransistor PT1 so as to turn the phototransistor PT1 to the ON state, when the isolated switch-mode power supply device 1 is operated in a continuous operation. By contrast, the mode switching signal generating unit 70 is configured to cancel the ON state of the phototransistor PT1 based on the mode switching signal so as to allow the outputted-voltage lower-limit detecting unit 60 to turn on or off the phototransistor PT1, when the isolated switch-mode power supply device 1 is operated in a standby mode.

Operation of Isolated Switch-Mode Power Supply Device 1

The isolated switch-mode power supply device 1 thus configured controls to convert an inputted voltage inputted from the input terminal IN into a required outputted voltage by controlling to switch the switching element Q1 between the normal mode and the standby mode using the control circuit 2 according to the outputted voltage and the mode switching signal, and outputs this outputted voltage through the output terminal OUT. It should be noted that according to this embodiment, the control circuit 2 burst-controls the switching element Q1 in the standby mode.

Figure 2:
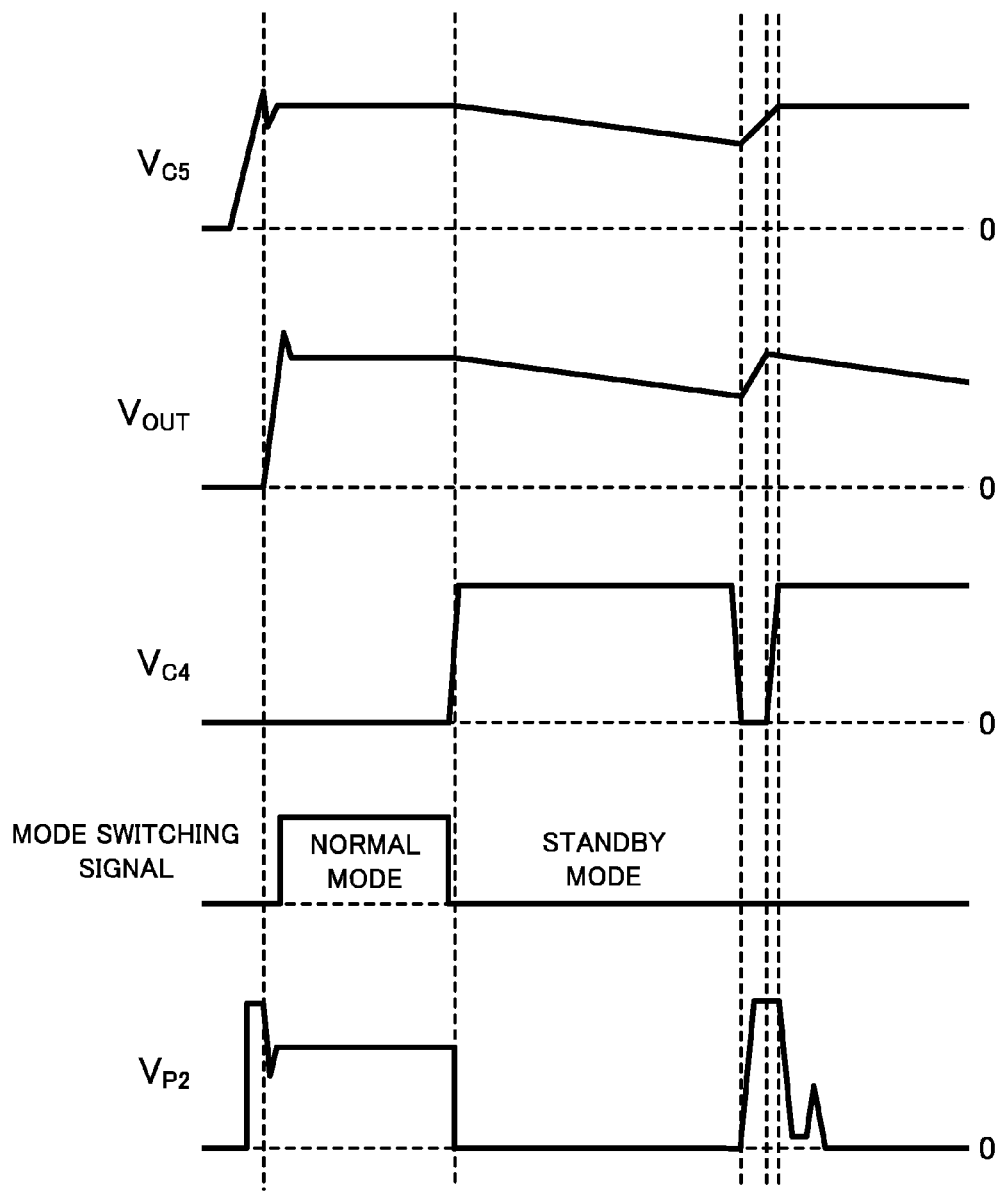
FIG. 2 is a timing chart of the isolated switch-mode power supply device.

FIG. 2 is a timing chart of the isolated switch-mode power supply device 1. A reference symbol $V_{C5}$ represents a capacitor charge voltage of the capacitor C5, $V_{OUT}$ represents the outputted voltage outputted through the output terminal OUT, and a reference symbol $V_{C4}$ represents a capacitor charge voltage of the capacitor C4. A reference symbol $V_{P2}$ represents a voltage of the terminal P2.

As shown in FIG. 2, while the switching element Q1 oscillates and the outputted voltage $V_{OUT}$ is substantially constant in the normal mode, in the standby mode, the switching element Q1 performs intermittent oscillation, and a period in which the outputted voltage $V_{OUT}$ gradually decreases and a period in which the outputted voltage $V_{OUT}$ rapidly increases are alternately repeated.

Configuration of Control Circuit 2

Figure 3:
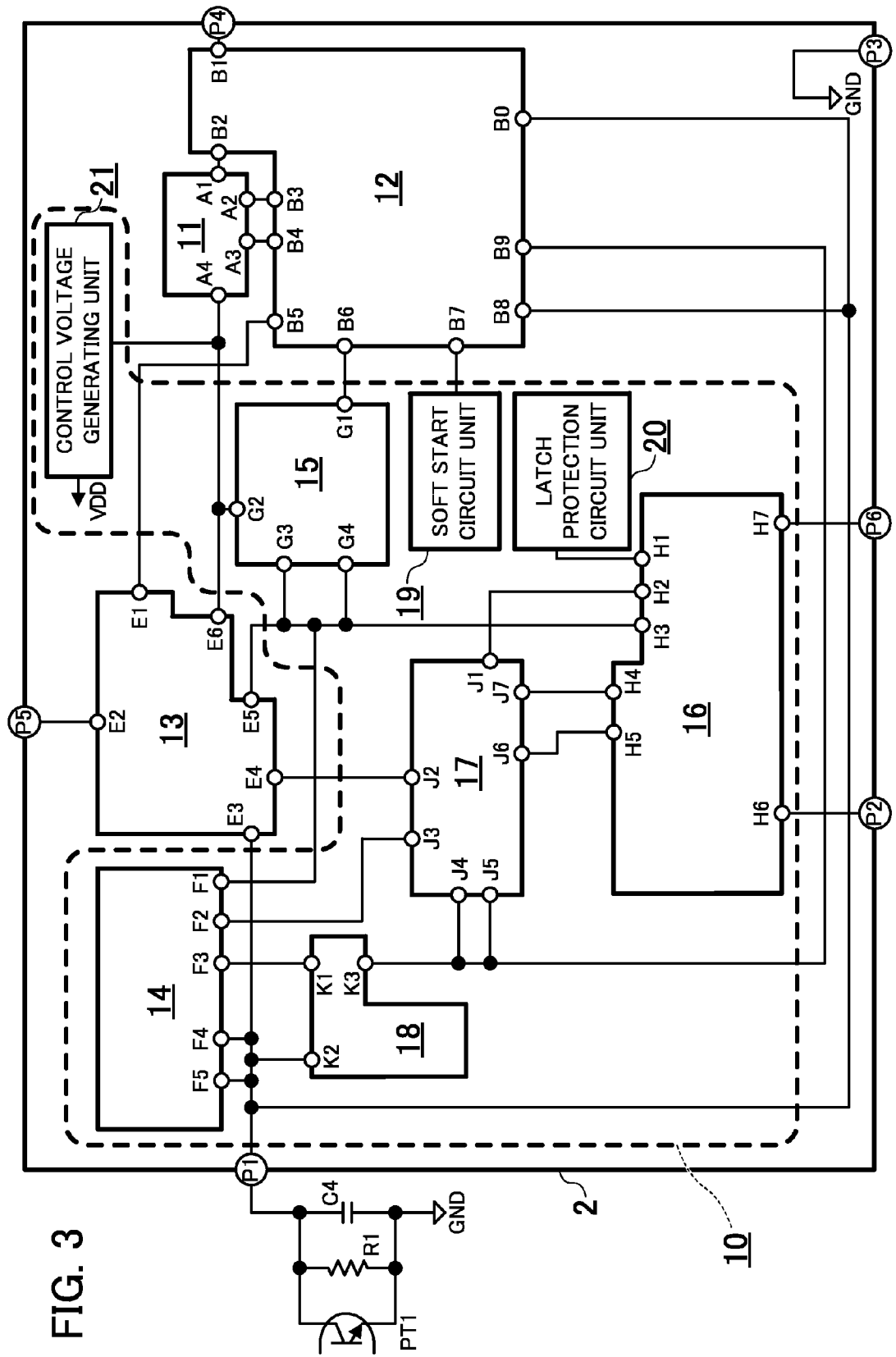
FIG. 3 is a circuit diagram of a control circuit provided for the isolated switch-mode power supply device.

FIG. 3 is a circuit diagram of the control circuit 2. The control circuit 2 is provided with a first control unit 10, a control power supply switching unit 11, a second control unit 12, and a startup circuit unit 13. The first control unit 10 is provided with a constant current supplying unit 14, a low-voltage-error preventing circuit unit 15, an oscillation control unit 16, an oscillation stop control unit 17, a capacitor charge voltage detecting unit 18, a soft start circuit unit 19, a latch protection circuit unit 20, and a control voltage generating unit 21.

Configuration of Control Power Supply Switching Unit 11

Figure 4:
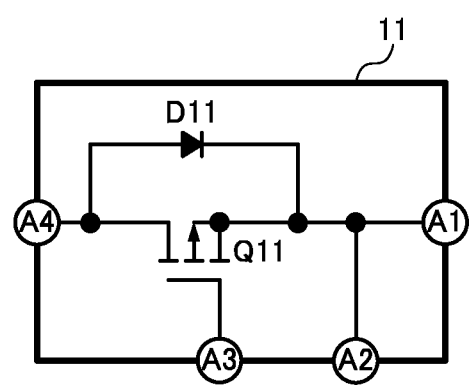
FIG. 4 is a circuit diagram of a control power supply switching unit provided for the control circuit.

FIG. 4 is a circuit diagram of the control power supply switching unit 11. The control power supply switching unit 11 is provided with a diode D11, and a switching element Q11 configured by a P-channel MOSFET. Through the switching element Q11, a contact point A1 and a contact point A4 are connected. Specifically, a source of the switching element Q11 is connected to the contact point A1, and a drain of the switching element Q11 is connected to the contact point A4. The source of the switching element Q11 is also connected to a contact point A2 and a cathode of the diode D11, and the drain of the switching element Q11 is also connected to an anode of the diode D11. A gate of the switching element Q11 is connected to a contact point A3.

Configuration of Second Control Unit 12

Figure 5:
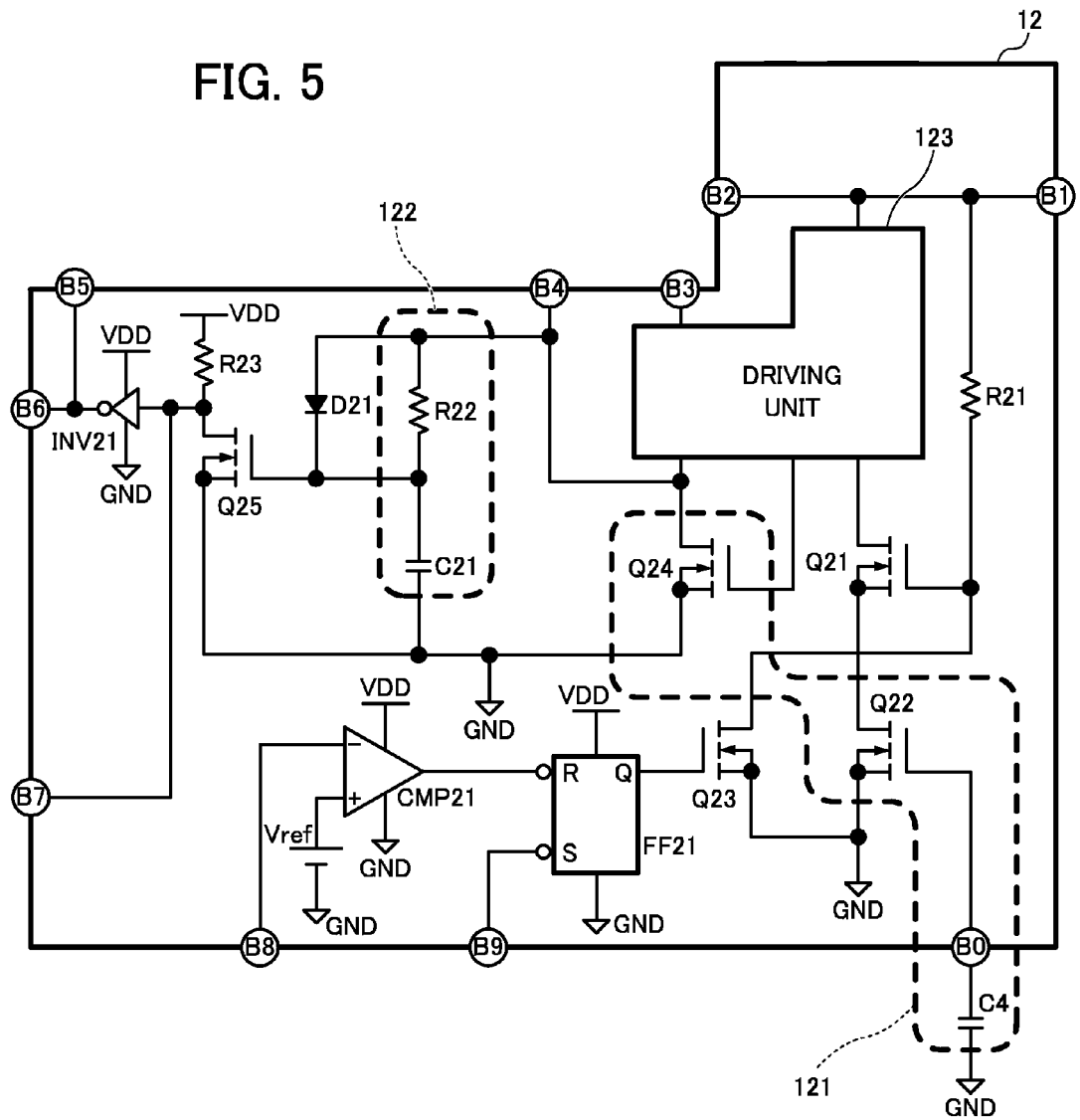
FIG. 5 is a circuit diagram of a second control unit provided for the control circuit.

FIG. 5 is a circuit diagram of the second control unit 12. The second control unit 12 is provided with a driving unit 123, a capacitor C21, a comparator CMP21, a diode D21, a flip-flop FF21 configured by an NAND gate, an inverter INV21, switching elements Q21-Q25 each configured by an N-channel MOSFET, and resistances R21-R23. It should be noted that, while the description with reference to FIG. 5 emphasizes that the comparator CMP21, the flip-flop FF21, and the inverter INV21 are connected to a control voltage source VDD and a reference potential source GND for convenience sake, the comparator, the flip-flop, and the inverter are also connected to the control voltage source VDD and the reference potential source GND while not shown in FIG. 5.

Configuration of Capacitative Element Unit 121

The switching elements Q22 and Q24 and the capacitor C4 constitute a capacitance element unit 121. One end of the capacitor C4 is connected to a gate of the switching element Q22 via a contact point B0. The other end of the capacitor C4 is connected to the reference potential source GND, to which a source of the switching element Q22 and a source of the switching element Q24 are also connected.

A drain of the switching element Q22 is connected to a gate of the switching element Q24 via the switching element Q21 and the driving unit 123. Specifically, the drain of the switching element Q22 is connected to a source of the switching element Q21, and a drain of the switching element Q21 is connected to the gate of the switching element Q24 via the driving unit 123.

Further, the drain of the switching element Q22 is connected to one end of the capacitor C5 shown in FIG. 1, via the switching element Q21, the driving unit 123, a contact point B1, and the terminal P4 shown in FIG. 3. Specifically, the drain of the switching element Q22 is connected to the source of the switching element Q21, and the drain of the switching element Q21 is connected to the contact point B1 via the driving unit 123. The contact point B1 is connected to the terminal P4 as shown in FIG. 3, and the terminal P4 is connected to the one end of the capacitor C5 as shown in FIG. 1.

Referring back to FIG. 5, the contact point B1 is also connected to a contact point B2. The contact point B2 is connected to the contact point A1 shown in FIG. 3.

A drain of the switching element Q24 is connected to the gate of the switching element Q11 shown in FIG. 4 via the contact point B4 and the contact point A3 shown in FIG. 3, and to a contact point B3 via the driving unit 123.

Configuration of Second Control Unit 12 Excluding Capacitative Element Unit 121

A gate of the switching element Q21 is connected to the contact point B1 via the resistance R21, and to the reference potential source GND via the switching element Q23. Specifically, the gate of the switching element Q21 is connected to a drain of the switching element Q23, and a source of the switching element Q23 is connected to the reference potential source GND.

The contact point B4 is also connected to the diode D21 and a time constant circuit 122 constituted by the resistance R22, and the capacitor C21. Specifically, the contact point B4 is connected to an anode of the diode D21 and to one end of the resistance R22. A cathode of the diode D21 and the other end of the resistance R22 are connected to a gate of the switching element Q25 and to the reference potential source GND via the capacitor C21.

A source of the switching element Q25 is connected to the reference potential source GND, and a drain of the switching element Q25 is connected to the control voltage source VDD via the resistance R23 and to an input end of the inverter INV21. The input end of the inverter INV21 is connected to a contact point B7. An output end of the inverter INV21 is connected to contact points B5 and B6.

A gate of the switching element Q23 is connected to an output terminal of the flip-flop FF21, and a set terminal of the flip-flop FF21 is connected to a contact point B9. A reset terminal of the flip-flop FF21 is connected to an output terminal of the comparator CMP21. An inverting input terminal of the comparator CMP21 is connected to a contact point B8, a non-inverting input terminal of the comparator CMP21 is connected to a positive terminal of a direct-current power source Vref, and a negative terminal of the direct-current power source Vref is connected to the reference potential source GND.

Configuration of Startup Circuit Unit 13

Figure 6:
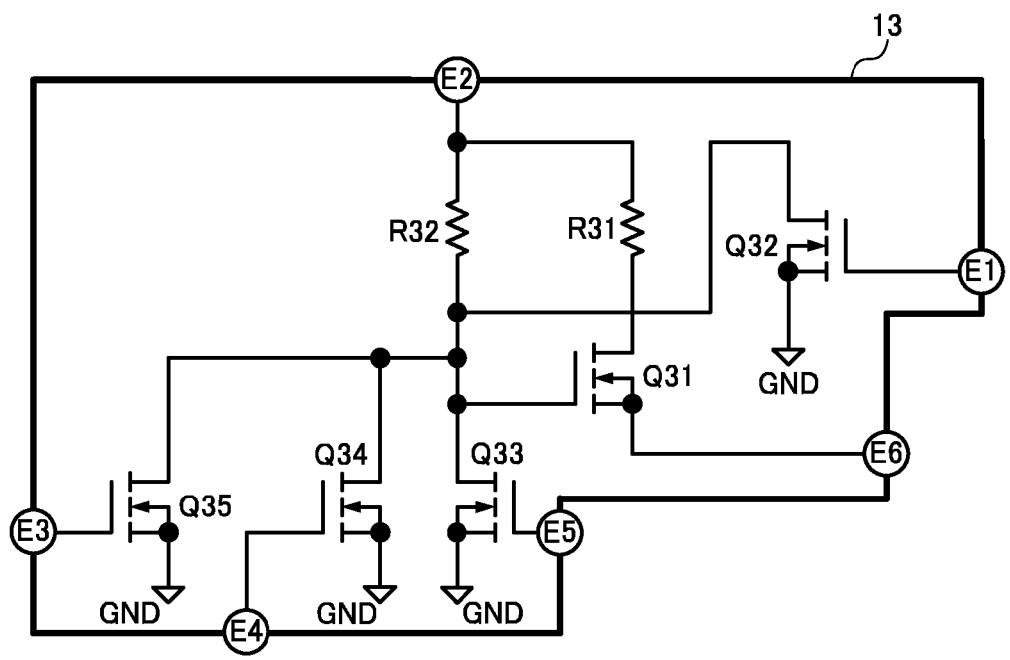
FIG. 6 is a circuit diagram of a startup circuit unit provided for the control circuit.

FIG. 6 is a circuit diagram of the startup circuit unit 13. The startup circuit unit 13 is provided with switching elements Q31-Q35 each configured by an N-channel MOSFET, and resistances R31 and R32.

A source of the switching element Q31 is connected to a contact point E6, and a drain of the switching element Q31 is connected to a contact point E2 via the resistance R31. A gate of the switching element Q31 is connected to the contact point E2 via the resistance R32, and to drains respectively of the switching elements Q32-Q35. A gate of the switching element Q32 is connected to a contact point E1, a gate of the switching element Q33 is connected to a contact point E5, a gate of the switching element Q34 is connected to a contact point E4, and a gate of the switching element Q35 is connected to a contact point E3. Sources respectively of the switching elements Q32-Q35 are connected to the reference potential source GND.

Configuration of Constant Current Supplying Unit 14

Figure 7:
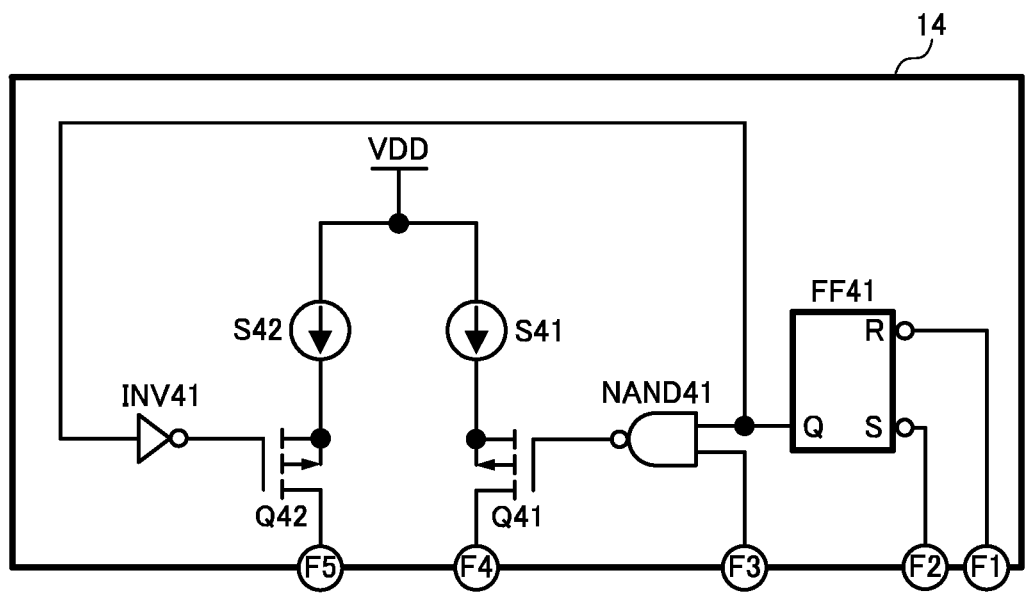
FIG. 7 is a circuit diagram of a constant current supplying unit provided for the control circuit.

FIG. 7 is a circuit diagram of the constant current supplying unit 14. The constant current supplying unit 14 is provided with a flip-flop FF41 configured by an NAND gate, an inverter INV41, a negative AND NAND41, switching elements Q41 and Q42 each configured by a P-channel MOSFET, and current sources S41 and S42.

A reset terminal of the flip-flop FF41 is connected to a contact point F1, a set terminal of the flip-flop FF41 is connected to a contact point F2, and an output terminal of the flip-flop FF41 is connected to an input terminal of the inverter INV41 and one of two input terminals of the negative AND NAND41. The other of the two input terminals of the negative AND NAND41 is connected to a contact point F3, and an output terminal of the negative AND NAND41 is connected to a gate of the switching element Q41. A drain of the switching element Q41 is connected to a contact point F4, and a source of the switching element Q41 is connected to the current source S41 connected to the control voltage source VDD. An output terminal of the inverter INV41 is connected to a gate of the switching element Q42, a drain of the switching element Q42 is connected to a contact point F5, and a source of the switching element Q42 is connected to the current source S42 connected to the control voltage source VDD.

Configuration of Low-Voltage-Error Preventing Circuit Unit 15

Figure 8:
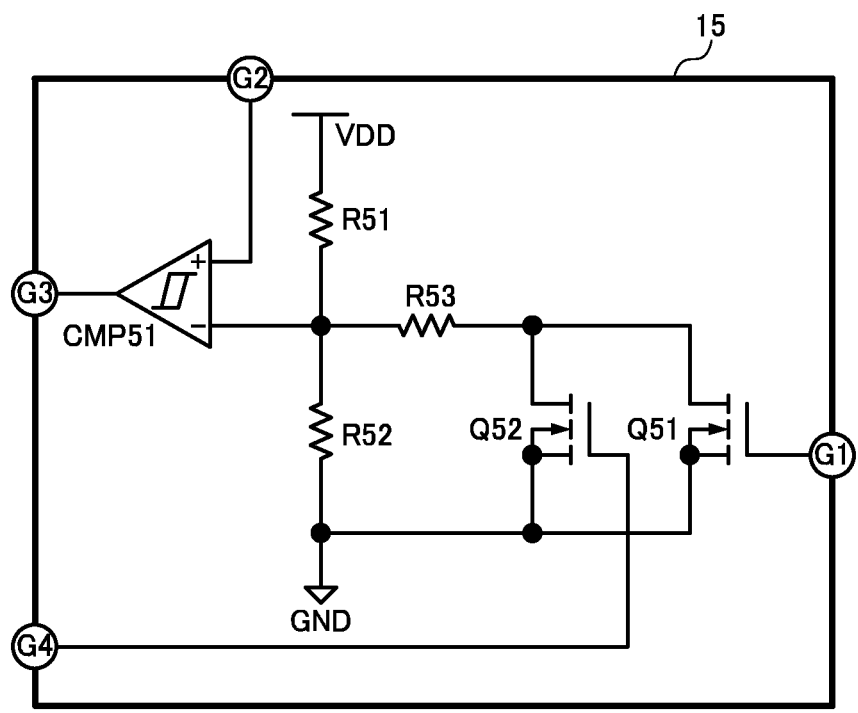
FIG. 8 is a circuit diagram of a low-voltage-error preventing circuit unit provided for the control circuit.

FIG. 8 is a circuit diagram of the low-voltage-error preventing circuit unit 15. The low-voltage-error preventing circuit unit 15 is provided with a comparator CMP51, switching elements Q51 and Q52 each configured by an N-channel MOSFET, and resistances R51-R53.

The resistance R51 and the resistance R52 are connected in series, and the control voltage source VDD and the reference potential source GND are connected to each other via the series-connected resistances R51 and R52. To the resistance R52, a part in which the resistance R53 and the switching element Q51 are connected in series and apart in which the resistance R53 and the switching element Q52 are connected in series are connected in parallel. Specifically, a connecting point between the resistance R51 and the resistance R52 is connected to one end of the resistance R53, and the other end of the resistance R53 is connected to drains respectively of the switching elements Q51 and Q52. Sources respectively of the switching elements Q51 and Q52 are connected to the reference potential source GND. A gate of the switching element Q51 is connected to a contact point G1, and a gate of the switching element Q52 is connected to a contact point G4. Further, a connecting point between the resistance R51 and the resistance R52 is also connected to an inverting input terminal of the comparator CMP51. A non-inverting input terminal of the comparator CMP51 is connected to a contact point G2, and an output terminal of the comparator CMP51 is connected to a contact point G3.

Configuration of Oscillation Control Unit 16

Figure 9:
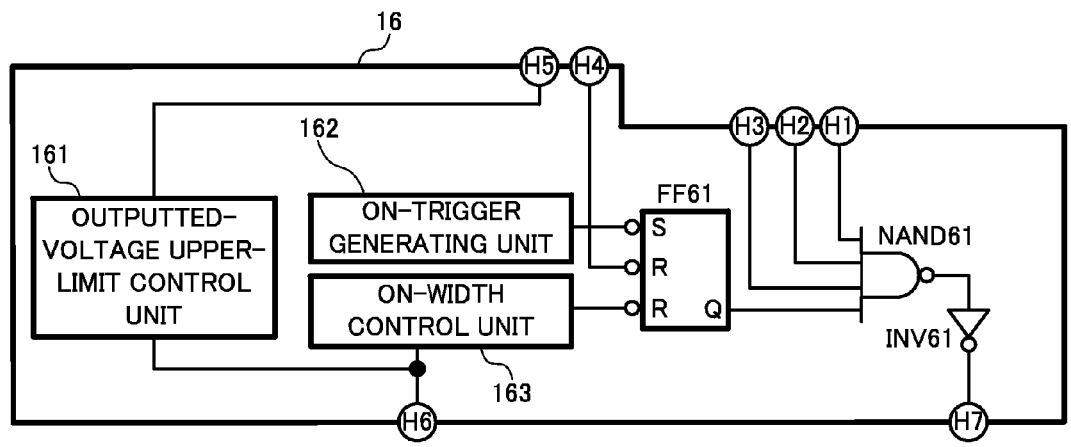
FIG. 9 is a circuit diagram of an oscillation control unit provided for the control circuit.

FIG. 9 is a circuit diagram of the oscillation control unit 16. The oscillation control unit 16 is provided with an outputted-voltage upper-limit control unit 161, an on-trigger generating unit 162, an on-width control unit 163, a flip-flop FF61 configured by an NAND gate, an inverter INV61, and a negative AND NAND61.

The outputted-voltage upper-limit control unit 161 is connected to contact points H5 and H6, and to the on-width control unit 163. The on-width control unit 163 is connected to the contact point H6, and to a second reset terminal of the flip-flop FF61. A set terminal of the flip-flop FF61 is connected to the on-trigger generating unit 162, and a first reset terminal of the flip-flop FF61 is connected to a contact point H4. Four input terminals of the negative AND NAND61 are respectively connected to contact points H1-H3 and an output terminal of the flip-flop FF61. An output terminal of the negative AND NAND61 is connected to an input terminal of the inverter INV61, and the output terminal of the inverter INV61 is connected to a contact point H7.

Configuration of Oscillation Stop Control Unit 17

Figure 10:
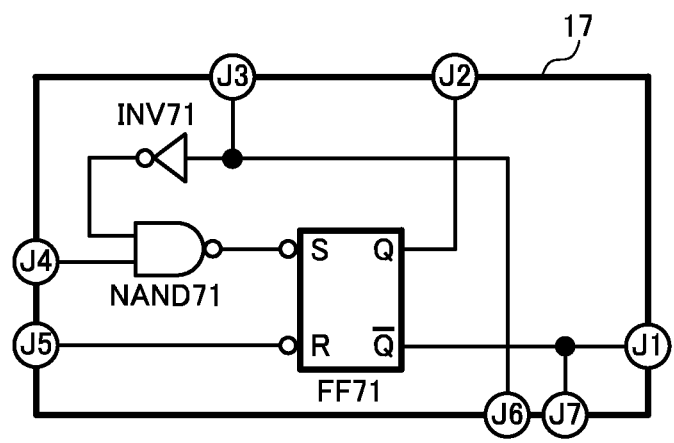
FIG. 10 is a circuit diagram of an oscillation stop control unit provided for the control circuit.

FIG. 10 is a circuit diagram of the oscillation stop control unit 17. The oscillation stop control unit 17 is provided with a flip-flop FF71 configured by an NAND gate, an inverter INV71, and a negative AND NAND71.

A reset terminal of the flip-flop FF71 is connected to a contact point J5, an output terminal of the flip-flop FF71 is connected to a contact point J2, and an inverting output terminal of the flip-flop FF71 is connected to contact points J1 and J7. A set terminal of the flip-flop FF71 is connected to an output terminal of the negative AND NAND71, one of two input terminals of the negative AND NAND71 is connected to a contact point J4, and the other of the two input terminals of the negative AND NAND71 is connected to an output terminal of the inverter INV71. An input terminal of the inverter INV71 is connected to contact points J3 and J6.

Configuration of Capacitor Charge Voltage Detecting Unit 18

Figure 11:
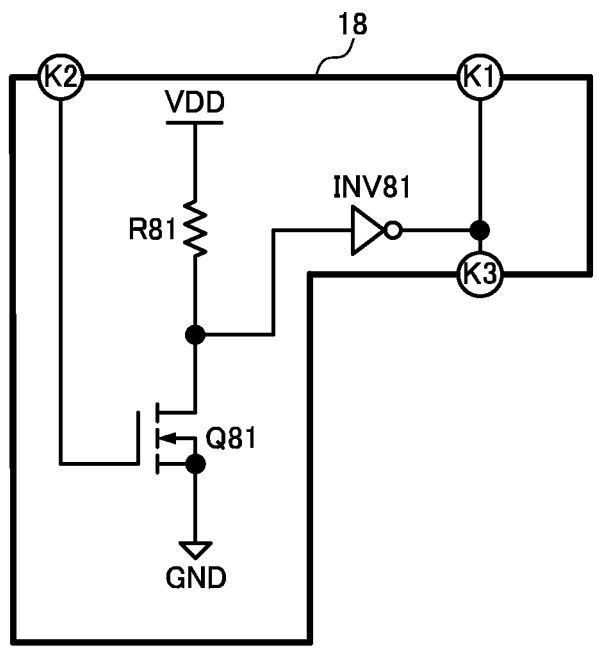
FIG. 11 is a circuit diagram of a capacitor charge voltage detecting unit provided for the control circuit.

FIG. 11 is a circuit diagram of the capacitor charge voltage detecting unit 18. The capacitor charge voltage detecting unit 18 is provided with an inverter INV81, a switching element Q81 configured by an N-channel MOSFET, and a resistance R81.

A gate of the switching element Q81 is connected to a contact point K2, a source of the switching element Q81 is connected to the reference potential source GND, and a drain of the switching element Q81 is connected to the control voltage source VDD via the resistance R81. The control voltage source VDD is also connected to an input terminal of the inverter INV81 via the resistance R81. An output terminal of the inverter INV81 is connected to contact points K1 and K3.

Operation of Control Circuit 2 in Normal Mode

The control circuit 2 thus configured will be now described, first, in relation to an operation in the normal mode, with reference to FIG. 1 to FIG. 11.

In the normal mode, the mode switching signal generating unit 70 in FIG. 1 turns the phototransistor PT1 to the ON state. Then, the capacitor C4 is discharged by the resistance R1 and the phototransistor PT1, and the capacitor charge voltage of the capacitor C4 decreases down substantially to zero. With this, as shown in FIG. 3, a voltage at the contact point B0 of the second control unit 12 connected to the capacitor C4 via the terminal P1 also decreases, and the switching element Q22 in FIG. 5 is turned to the OFF state.

Further, the gate of the switching element Q21 is connected to the capacitor C5 in FIG. 1 via the resistance R21, the contact point B1, and the terminal P4 in FIG. 3, and the capacitor C5 is connected in parallel to the control coil T2 via the diode D1. Here, in the normal mode, as the switching element Q1 oscillates as described above, a voltage is generated in the control coil T2. Therefore, the capacitor charge voltage of the capacitor C5 is substantially equal to the voltage generated in the control coil T2. Thus, a gate voltage is applied to the switching element Q21 in FIG. 5. However, the switching element Q21 is turned to the OFF state by the comparator CMP21, the flip-flop FF21, and the switching element Q23.

Specifically, the inverting input terminal of the comparator CMP21 is connected to the capacitor C4 via the contact point B8 and the terminal P1 in FIG. 3. The comparator CMP21 compares the capacitor charge voltage of the capacitor C4 with a voltage of the positive terminal of the direct-current power source Vref, and outputs an H-level voltage when the capacitor charge voltage of the capacitor C4 is lower than Vth2.

Here, in the normal mode, as the capacitor charge voltage of the capacitor C4 decreases down substantially to zero as described above, the capacitor charge voltage of the capacitor C4 becomes lower than Vth2, and as a result, the comparator CMP21 outputs the H-level voltage. The H-level voltage is applied to the reset terminal of the flip-flop FF21. By contrast, as the capacitor charge voltage of the capacitor C4 is also lower than Vth3, the switching element Q81, shown in FIG. 11, whose gate is connected to the capacitor C4 via the terminal P1 and the contact point K2 of the capacitor charge voltage detecting unit 18, is turned to the OFF state, and the inverter INV81 outputs an L-level voltage. The L-level voltage is applied to the set terminal of the flip-flop FF21 in FIG. 5 via the contact point K3 and the contact point B9 of the second control unit 12 in FIG. 3.

Consequently, in the flip-flop FF21, the H-level voltage is applied to its reset terminal, and the L-level voltage is applied to its set terminal. Accordingly, the H-level voltage is outputted from the output terminal of the flip-flop FF21, and the switching element Q23 is turned to the ON state. With this, the gate voltage of the switching element Q21 drops, and the switching element Q21 is turned to the OFF state.

The driving unit 123 in FIG. 5 turns the switching element Q24 to the ON state when at least one of the switching elements Q21 and Q22 is in the OFF state. Accordingly, as the switching elements Q21 and Q22 are both in the OFF state as described above, the switching element Q24 is turned to the ON state, and as a result, the contact point B4 and the reference potential source GND become conductive.

The contact point B4 is connected to the contact point A3 of the control power supply switching unit 11 in FIG. 3, and the contact point A3 is connected to the gate of the switching element Q11 in FIG. 4. Accordingly, when the contact point B4 and the reference potential source GND become conductive as described above, the switching element Q11 is turned to the ON state, and the contact point A1 and the contact point A4 become conductive.

The contact point A1 is connected to the capacitor C5 via the contact point B2 of the second control unit 12 in FIG. 3, the contact point B1 in FIG. 5, and the terminal P4 in FIG. 3. Accordingly, when the switching element Q11 is turned to the ON state, the capacitor charge voltage of the capacitor C5 is supplied to the first control unit 10. When the capacitor charge voltage of the capacitor C5 is supplied to the first control unit 10, the control voltage generating unit 21 supplies a control voltage to various circuits in the control circuit 2 as the control voltage source VDD. With this, the various circuits in the control circuit 2 are operated, and a control signal is supplied to the gate of the switching element Q1 in FIG. 1 according to a cyclic signal outputted from the on-trigger generating unit 162 in FIG. 9 to cause the switching element Q1 to oscillate.

Operation of Control Circuit 2 in Standby Mode

Next, an operation of the control circuit 2 in the standby mode will be described with reference to FIG. 1 to FIG. 11 shown above and to FIG. 12 that will be shown below.

Figure 12:
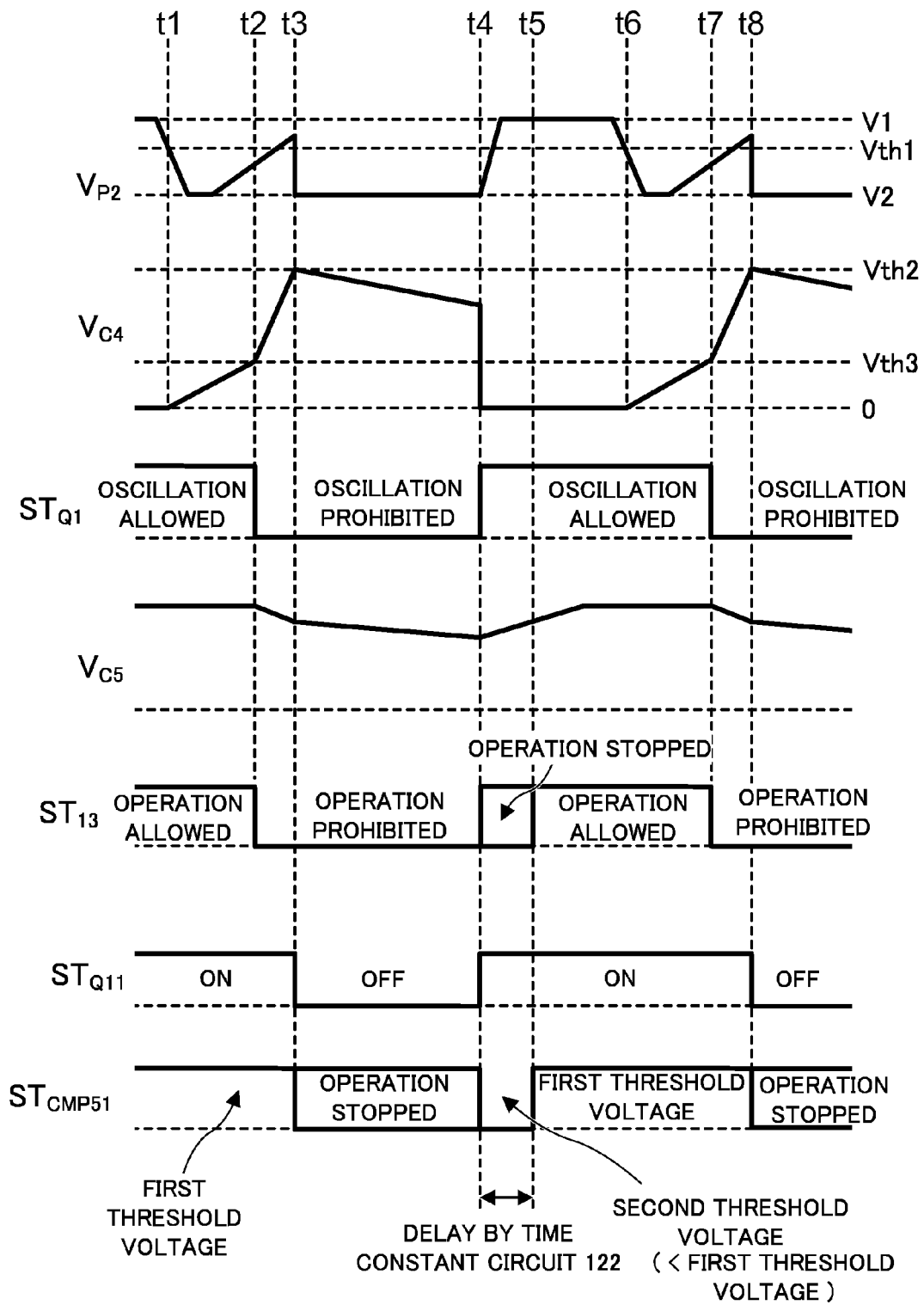
FIG. 12 is a timing chart of the control circuit in a standby mode.

FIG. 12 is a timing chart of the control circuit 2 in the standby mode. The reference symbol $V_{P2}$ represents the voltage of the terminal P2, and the reference symbol $V_{C4}$ represents the capacitor charge voltage of the capacitor C4 in FIG. 1. A reference symbol $ST_{Q1}$ represents a state of the switching element Q1 in FIG. 1, and the reference symbol $V_{C5}$ represents the capacitor charge voltage of the capacitor C5 in FIG. 1. A reference symbol $ST_{13}$ represents a state of the startup circuit unit 13 in FIG. 6. A reference symbol $ST_{Q11}$ represents a state of the switching element Q11 in FIG. 4, and a reference symbol $ST_{CMP51}$ represents a state of the comparator CMP51 in FIG. 8.

First, at time t1, the capacitor charge voltage $V_{C4}$ of the capacitor C4 is zero. Accordingly, the switching element Q22 in FIG. 5 is in the OFF state.

Further, the capacitor C4 in FIG. 3 is connected to the gate of the switching element Q81 in FIG. 11 via the terminal P1 and the contact point K2 of the capacitor charge voltage detecting unit 18. Accordingly, when the capacitor charge voltage $V_{C4}$ of the capacitor C4 is zero, the switching element Q81 is turned to the OFF state, and an L-level voltage is outputted from the output terminal of the inverter INV81. The L-level voltage is applied to the set terminal of the flip-flop FF21 in FIG. 5 via the contact point K3 and the contact point B9 of the second control unit 12 in FIG. 3. Therefore, an H-level voltage is outputted from the output terminal of the flip-flop FF21, and the switching element Q23 is turned to the ON state. Thus, as described above, the gate voltage of the switching element Q21 drops, and the switching element Q21 is in the OFF state.

Consequently, as the switching elements Q21 and Q22 are both in the OFF state, as described above, the driving unit 123 turns the switching element Q24 to the ON state, and the switching element Q11 in FIG. 4 is in the ON state.

With this, the capacitor charge voltage $V_{C5}$ of the capacitor C5 in FIG. 1 is supplied to the first control unit 10, and the control voltage is supplied from the control voltage source VDD to the various circuits in the control circuit 2.

The control voltage supplied to the first control unit 10 is applied to the non-inverting input terminal of the comparator CMP51 in FIG. 8 via the contact point G2 of the low-voltage-error preventing circuit unit 15 in FIG. 3. The comparator CMP51 has hysteresis characteristics. The comparator CMP51 outputs an H-level voltage when the voltage of the non-inverting input terminal is not lower than a first threshold voltage, and outputs an L-level voltage when the voltage of the non-inverting input terminal is not higher than a second threshold voltage that is lower than the first threshold voltage. Here, the control voltage supplied to the first control unit 10 is higher than the first threshold voltage. Accordingly, when the control voltage supplied to the first control unit 10 is applied to the non-inverting input terminal, the H-level voltage is outputted from the output terminal of the comparator CMP51, and a voltage of the contact point G3 is H-level.

The H-level voltage is applied to the reset terminal of the flip-flop FF41 in FIG. 7 via the contact point F1 of the constant current supplying unit 14 in FIG. 3. By contrast, as the outputted voltage has reached the upper limit voltage at time t1, the outputted-voltage upper-limit control unit 161 in FIG. 9 outputs an L-level voltage. The L-level voltage is applied to the set terminal of the flip-flop FF41 in FIG. 7 via the contact point H5, the contact point J6 of the oscillation stop control unit 17 in FIG. 3, the contact point J3 in FIG. 10, and the contact point F2 of the constant current supplying unit 14 in FIG. 3.

Consequently, in the flip-flop FF41, the H-level voltage is applied to its reset terminal, and the L-level voltage is applied to its set terminal. Accordingly, the H-level voltage is outputted from the output terminal of the flip-flop FF41 and converted into an L-level voltage by the inverter INV41, and the switching element Q42 is turned to the ON state. With this, a constant current outputted from the current source S42 is supplied to the capacitor C4 via the switching element Q42, the contact point F5, and the terminal P1 in FIG. 3, thereby charging the capacitor C4.

Further, the H-level voltage outputted from the output terminal of the flip-flop FF41 is also applied to one of the two input terminals of the negative AND NAND41. By contrast, to the other of the two input terminals of the negative AND NAND41, the L-level voltage from the output terminal of the inverter INV81 in FIG. 11 is applied via the contact point F3 and the contact point K1 of the capacitor charge voltage detecting unit 18 in FIG. 3. Accordingly, as the switching element Q41 in FIG. 7 is turned to the OFF state, the constant current is not supplied to the capacitor C4 from the current source S41.

Thus, at time t1, the charging of the capacitor C4 by the constant current supplied from the current source S42 starts, and the capacitor charge voltage $V_{C4}$ of the capacitor C4 increases over time, up to Vth3 at time t2.

Next, at time t2, when the capacitor charge voltage $V_{C4}$ of the capacitor C4 becomes Vth3, the switching element Q81 in FIG. 11 is turned to the ON state. Then, an H-level voltage is outputted from the output terminal of the inverter INV81, and the H-level voltage is applied to the other of the two input terminals of the negative AND NAND41 in FIG. 7 via the contact point K1 and the contact point F3 of the constant current supplying unit 14 in FIG. 3. Accordingly, the switching element Q41 in FIG. 7 is turned to the ON state, and the constant current outputted from the current source S41 is supplied to the capacitor C4 via the switching element Q41, the contact point F4, and the terminal P1 in FIG. 3, thereby charging the capacitor C4.

Thus, at time t2, the charging of the capacitor C4 is started by the constant current supplied from the current source S41 and the constant current supplied from the current source S42, and the capacitor charge voltage $V_{C4}$ of the capacitor C4 increases over time, up to Vth2 at time t3.

Further, at time t2, when the capacitor charge voltage $V_{C4}$ of the capacitor C4 becomes Vth3, the voltage of the contact point E3 of the startup circuit unit 13 in FIG. 3 becomes Vth3, and the switching element Q35 in FIG. 6 is turned to the ON state. Accordingly, the gate voltage of the switching element Q31 drops, and the switching element Q31 is in the OFF state.

Thus, at time t2, the switching element Q31 is fixed to the OFF state, and the operation of the startup circuit unit 13 is prohibited.

Moreover, at time t2, the outputted-voltage upper-limit control unit 161 in FIG. 9 outputs an L-level voltage as the outputted voltage reaching the upper limit voltage. The L-level voltage is applied to the input terminal of the inverter INV71 in FIG. 10 via the contact point H5 and the contact point J6 of the oscillation stop control unit 17 in FIG. 3, and an H-level voltage is applied to the other of the two input terminals of the negative AND NAND71. By contrast, to one of the two input terminals of the negative AND NAND71, an H-level voltage is applied from the output terminal of the inverter INV81 in FIG. 11 via the contact point J4 and the contact point K3 of the capacitor charge voltage detecting unit 18 in FIG. 3.

Consequently, an L-level voltage is outputted from the output terminal of the negative AND NAND71 in FIG. 10, and the L-level voltage is applied to one of the four input terminals of the negative AND NAND61 via the flip-flop FF71, the contact point J7, the contact point H4 of the oscillation control unit 16 in FIG. 3, and the flip-flop FF61 in FIG. 9. With this, regardless of the voltages applied to the remaining three of the four input terminals of the negative AND NAND61, an H-level voltage is outputted from the output terminal of the negative AND NAND61. The H-level voltage is converted into an L-level voltage by the inverter INV61, and then applied to the gate of the switching element Q1 in FIG. 1 via the contact point H7 and the terminal P6 in FIG. 3.

Thus, at time t2, the switching element Q1 is fixed to the OFF state, and the oscillation of the switching element Q1 is prohibited.

Further, at time t2, when the capacitor charge voltage $V_{C4}$ of the capacitor C4 becomes Vth3, the switching element Q22 in FIG. 5 is turned to the ON state. By contrast, the switching element Q21 is maintained in the OFF state by the comparator CMP21, the flip-flop FF21, and the switching element Q23 that are shown in FIG. 5.

Specifically, as the capacitor charge voltage $V_{C4}$ of the capacitor C4 at time t2 is Vth3 lower than Vth2, the comparator CMP21 outputs an H-level voltage. Accordingly, the H-level voltage is applied to the reset terminal the flip-flop FF21. By contrast, an H-level voltage is applied to the set terminal of the flip-flop FF21 from the output terminal of the inverter INV81 in FIG. 11 via the contact point B9 and the contact point K3 of the capacitor charge voltage detecting unit 18 in FIG. 3.

Consequently, in the flip-flop FF21, the H-level voltage is applied to its reset terminal, and the H-level voltage is applied to its set terminal. Accordingly, the H-level voltage is outputted from the output terminal of the flip-flop FF21 without any change from the previous state that has been maintained, and the switching element Q23 is maintained in the ON state. With this, as described above, the gate voltage of the switching element Q21 drops, and the switching element Q21 is maintained in the OFF state.

Consequently, at time t2, while the switching element Q22 is turned to the ON state, the switching element Q21 is maintained in the OFF state. As described above, if at least one of the switching elements Q21 and Q22 is in the OFF state, the driving unit 123 turns the switching element Q24 to the ON state. Accordingly, the switching element Q24 is maintained in the ON state, and the contact point B4 and the reference potential source GND become conductive via the switching element Q24.

Thus, at time t2, the switching element Q11 in FIG. 4 is maintained in the ON state.

Next, at time t3, as the comparator CMP21 in FIG. 5 outputs an L-level voltage when the capacitor charge voltage $V_{C4}$ of the capacitor C4 becomes Vth2, the switching element Q23 is turned to the OFF state, and the capacitor charge voltage of the capacitor C5 is applied to the gate of the switching element Q21 via the resistance R21, the contact point B1, and the terminal P4 in FIG. 3. Accordingly, the switching element Q21 is turned to the ON state. While the driving unit 123 turns the switching element Q24 to the ON state when at least one of the switching elements Q21 and Q22 is in the OFF state as described above, the driving unit 123 turns the switching element Q24 to the OFF state when both of the switching elements Q21 and Q22 are in the ON state. With this, the capacitor charge voltage of the capacitor C5 is applied to the gate of the switching element Q11 in FIG. 4 via the contact point A3, the contact point B4 of the second control unit 12 in FIG. 3, the driving unit 123, the contact point B1, and the terminal P4 in FIG. 3.

Thus, at time t3, the gate of the switching element Q11 is not driven, and the switching element Q11 is turned to the OFF state. Accordingly, the supply of the capacitor charge voltage $V_{C5}$ of the capacitor C5 to the first control unit 10 is stopped, and the supply of the control voltage from the control voltage source VDD to the various circuits in the control circuit 2 is stopped. With this, the operation of the first control unit 10 stops, and the operations of the comparator CMP21, the flip-flop FF21, and the inverter INV21 in the second control unit 12 also stop. Specifically, when the switching element Q11 is in the OFF state, a part of the second control unit 12, in addition to the first control unit 10, stops its operation.

Further, at time t3, the charging of the capacitor C4 by the constant current supplied from the current source S41 and the constant current supplied from the current source S42 stop. Accordingly, the capacitor charge voltage $V_{C4}$ of the capacitor C4 decreases over time as the capacitor C4 is discharged due to the resistance R1.

Moreover, at time t3, as the voltage of the contact point B4 in FIG. 5 is H-level as described above, the capacitor C21 is charged.

Next, at time t4, the outputted-voltage lower-limit detecting unit 60 in FIG. 1 detects that the outputted voltage has decreased down to the lower limit voltage, and turns the phototransistor PT1 to the ON state. Then, the capacitor C4 is discharged quickly, and the capacitor charge voltage $V_{C4}$ of the capacitor C4 becomes zero.

At time t4, when the capacitor charge voltage $V_{C4}$ of the capacitor C4 becomes zero as described above, the switching element Q22 in FIG. 5 is turned to the OFF state, and therefore the switching element Q11 in FIG. 4 is turned to the ON state as described above.

Thus, at time t4, as the switching element Q11 is turned to the ON state and the control voltage is supplied to the various circuits in the control circuit 2, the switching element Q1 in FIG. 1 is allowed to oscillate.

Further, at time t4, when the capacitor charge voltage $V_{C4}$ of the capacitor C4 becomes zero as described above, the switching element Q35 in FIG. 6, whose gate is connected to the capacitor C4 via the terminal P1 and the contact point E3 of the startup circuit unit 13 that are shown in FIG. 3, is turned to the OFF state. Accordingly, the fixation of the switching element Q31 to the OFF state is released. With this, the prohibition of the operation of the startup circuit unit 13 is lifted.

However, at time t4, by the capacitor charge voltage of the capacitor C21 in FIG. 5 thus charged, the switching element Q25 is turned to the ON state. Accordingly, an H-level voltage is applied to the gate of the switching element Q32 in FIG. 6 via the inverter INV21, the contact point B5, and the contact point E1 of the startup circuit unit 13 in FIG. 3, and the switching element Q32 is turned to the ON state. With this, the gate voltage of the switching element Q31 drops, and the switching element Q31 is turned to the OFF state.

Thus, at time t4, the switching element Q31 is turned to the OFF state, and the operation of the startup circuit unit 13 is stopped.

Further, at time t4, the switching element Q25 is in the ON state as described above. Accordingly, an H-level voltage is applied to the gate of the switching element Q51 in FIG. 8 via the inverter INV21, the contact point B6, and the contact point G1 in the low-voltage-error preventing circuit unit 15 in FIG. 3. Therefore, the switching element Q51 is turned to the ON state, and the resistance R52 is connected to the resistance R53 in parallel. With this, a threshold voltage used by the comparator CMP51 is fixed to the second threshold voltage.

Thus, at time t4, the threshold voltage used by the comparator CMP51 is fixed to the second threshold voltage.

Next, at time t5, the capacitor charge voltage of the capacitor C21 in FIG. 5 thus charged decreases down to a level at which the switching element Q32 in FIG. 6 and the switching element Q51 in FIG. 8 are both turned to the OFF state. It should be noted that a time period from time t4 to time t5 is determined based on a time constant of the time constant circuit 122 in FIG. 5.

Thus, at time t5, the stopping of the operation of the startup circuit unit 13 is released, the startup circuit unit 13 is allowed to operate, and the fixation of the threshold voltage used by the comparator CMP51 to the second threshold voltage is canceled.

From time t6 to time t8, the control circuit 2 operates in the same manner as has operated from time t1 to time t3.

According to the isolated switch-mode power supply device 1 described above, the following effects can be provided.

The isolated switch-mode power supply device 1 turns the switching element Q11 in FIG. 4 to the OFF state to stop the power supply from the capacitor C5 in FIG. 1 to the first control unit 10 in a part of a switching pause period in the standby mode, for example, as in a time period from time t3 to time t4 out of a time period from time t2 to time t4 in FIG. 12. Accordingly, the power consumption of the isolated switch-mode power supply device 1 in the standby mode can be reduced.

Further, the isolated switch-mode power supply device 1 performs the supply of the current from the constant current supplying unit 14 to the capacitor C4 within a time period in which the first control unit 10 receives the power supply from the capacitor C5 in FIG. 1, for example, as in a time period from time t1 to time t3 or from time t6 to time t8 in FIG. 12. Accordingly, it is possible to incorporate the constant current supplying unit 14 in the first control unit 10, and the power consumption of the isolated switch-mode power supply device 1 in the standby mode can be further reduced.

Moreover, as described above, the isolated switch-mode power supply device 1 turns the switching element Q11 in FIG. 4 to the OFF state to stop the power supply from the capacitor C5 in FIG. 1 to the first control unit 10 during the part of the switching pause period in the standby mode. Accordingly, the power consumption of the isolated switch-mode power supply device 1 can be reduced without making the capacitor charge voltage of the capacitor C5 in FIG. 1 0 V during the switching pause period in the standby mode. Therefore, as it is not necessary to operate the startup circuit unit 13 when shifting from the switching pause period to the oscillation period in the standby mode, the power consumption of the isolated switch-mode power supply device 1 can be sufficiently reduced.

Furthermore, the isolated switch-mode power supply device 1 turns the phototransistor PT1 to the ON state when the fact that the outputted voltage has become no higher than the lower limit voltage is detected by the outputted-voltage lower-limit detecting unit 60 in FIG. 1, and causes the capacitor C4 to be rapidly discharged as in time t4 in FIG. 12, for example. With this, the second control unit 12 turns the switching element Q11 in FIG. 4 to the ON state to resume the switching of the switching element Q1 in FIG. 1. Accordingly, it is possible to prevent the outputted voltage from being lower than the lower limit voltage.

In addition, the isolated switch-mode power supply device 1 turns the phototransistor PT1 to the ON state, when the fact that the outputted voltage has become no higher than the lower limit voltage is detected by the outputted-voltage lower-limit detecting unit 60 in FIG. 1, and when operating in the normal mode. Accordingly, as the phototransistor PT1 can be commonly used in the both cases, the reduction of the power consumption of the isolated switch-mode power supply device 1 in the standby mode can be realized at low cost.

Further, according to the isolated switch-mode power supply device 1, the capacitor C21 is charged during the time period in which the switching element Q11 in FIG. 4 is in the OFF state, for example, as in the time period from time t3 to time t4 in FIG. 12. Accordingly, it is possible to discriminate, based on the capacitor charge voltage of the capacitor C21 in FIG. 5, a case in which the power activation of the isolated switch-mode power supply device 1 is started from a case in which the power supply from the capacitor C5 in FIG. 1 to the first control unit 10 is resumed in the standby mode. Accordingly, when the power supply from the capacitor C5 in FIG. 1 to the first control unit 10 is resumed in the standby mode, it is possible to perform an operation suitable for the case in which the power supply to the first control unit 10 is resumed and that is different from an operation in the case in which the power activation to the isolated switch-mode power supply device 1 is started.

Moreover, the isolated switch-mode power supply device 1 is configured such that the capacitor C4 in FIG. 1 is connected to the resistance R1 in parallel. Accordingly, even in a case in which it is not possible to discharge the capacitor C4 by turning the phototransistor PT1 to the ON state in an occurrence of abnormity that a peak load over an output capacity of the isolated switch-mode power supply device 1 is caused in the standby mode, the capacitor C4 can be discharged by the resistance R1. Therefore, it is possible to resume the operation of the startup circuit unit 13 and the power supply to the first control unit 10 within time determined by capacities of the resistance R1 and the capacitor C4 and a residual voltage, and the isolated switch-mode power supply device 1 can be restored to a normal state from an abnormal state.

Furthermore, the isolated switch-mode power supply device 1 controls, depending on whether or not the capacitor charge voltage $V_{C4}$ of the capacitor C4 in FIG. 1 is no lower than Vth3, whether to charge the capacitor C4 based only on the current outputted from the current source S42 in FIG. 7 or on the currents outputted from both of the current sources S41 and S42. Accordingly, it is possible to reduce a loss when it is not necessary to increase the capacitor charge voltage $V_{C4}$ of the capacitor C4, and to quickly charge the capacitor C4 when it is necessary to increase the capacitor charge voltage $V_{C4}$ of the capacitor C4. Therefore, a proportion of a time period during which the power supply to the first control unit 10 is performed to an intermittent oscillation cycle can be made small, and the power consumption of the isolated switch-mode power supply device 1 in the standby mode can be further reduced.

In addition, the isolated switch-mode power supply device 1 turns the switching element Q11 in FIG. 4 to the OFF state when the capacitor charge voltage $V_{C4}$ of the capacitor C4 becomes no lower than Vth2, for example, as shown at time t3 in FIG. 12. Accordingly, it is possible to increase the capacitor charge voltage $V_{C4}$ of the capacitor C4 in FIG. 1 up to Vth2 during the time period in which the switching element Q11 is in the ON state, that is, during the time period in which the power supply to the first control unit 10 is performed. Therefore, it is possible to extend the state in which the electric charge remains in the capacitor C4, and in turn to extend the intermittent oscillation cycle, and as a result, the power consumption of the isolated switch-mode power supply device 1 in the standby mode can be further reduced.

Further, the isolated switch-mode power supply device 1 stops the switching of the switching element Q1, when the capacitor charge voltage $V_{C4}$ of the capacitor C4 is no lower than Vth3 and the outputted voltage is no lower than the upper limit voltage, for example, as shown at time t2 in FIG. 12. Accordingly, the oscillation can be stopped immediately when the outputted voltage reaches the upper limit voltage, and therefore it is possible to decrease a proportion of the oscillation period to the intermittent oscillation cycle, that is, oscillation duty of the intermittent oscillation, as well as a number of oscillation times of the switching element Q1 per unit time. Therefore, the power consumption of the isolated switch-mode power supply device 1 in the standby mode can be further reduced.

Moreover, the isolated switch-mode power supply device 1 stops the switching of the switching element Q1 when the capacitor charge voltage $V_{C4}$ of the capacitor C4 is no lower than Vth3 and the outputted voltage is no lower than the upper limit voltage. Accordingly, it is possible to control the switching of the switching element Q1 according to the outputted voltage, and to prevent the outputted voltage from exceeding the upper limit voltage. Here, as described above, the isolated switch-mode power supply device 1 can prevent the outputted voltage from becoming lower than the lower limit voltage. Therefore, the isolated switch-mode power supply device 1 can control the upper limit and the lower limit of the outputted voltage.

Furthermore, the isolated switch-mode power supply device 1 starts supplying the current from the constant current supplying unit 14 to the capacitor C4 when the outputted voltage becomes no lower than the upper limit voltage during the time period in which the power supply to the first control unit 10 is performed, as shown at time t1 in FIG. 12, for example. Accordingly, even during the time period in which the power supply to the first control unit 10 is performed, the capacitor C4 is not charged unless the outputted voltage increases up to the upper limit voltage. Therefore, it is possible to charge the capacitor C4 after the outputted voltage is acquired to some extent, and to prevent an erroneous operation from occurring.

In addition, the isolated switch-mode power supply device 1 prohibits the operation of the startup circuit unit 13 when the capacitor charge voltage $V_{C4}$ of the capacitor C4 becomes no lower than Vth3, as shown at time t2 in FIG. 12, for example. Accordingly, as the startup circuit unit 13 does not operates even if the power supply to the first control unit 10 is stopped, the power consumption of the isolated switch-mode power supply device 1 can be further reduced without providing any special circuit for monitoring the capacitor charge voltage of the capacitor C5 in FIG. 1 and stopping the operation of the startup circuit unit 13.

Further, according to the isolated switch-mode power supply device 1, when the capacitor charge voltage $V_{C4}$ of the capacitor C4 becomes lower than Vth3, as shown at time t4 in FIG. 12, for example, the second control unit 12 turns the switching element Q11 in FIG. 4 to the ON state to start the switching of the switching element Q1 in FIG. 1. Accordingly, it is possible to start the switching of the switching element Q1 before the outputted voltage becomes too low, and to prevent the outputted voltage from decreasing excessively.

Moreover, the isolated switch-mode power supply device 1 lifts the prohibition of the operation of the startup circuit unit 13, when the capacitor charge voltage $V_{C4}$ of the capacitor C4 becomes lower than Vth3, as shown at time t4 in FIG. 12, for example. Accordingly, the startup circuit unit 13 can be operated when the capacitor charge voltage of the capacitor C5 in FIG. 1 decreases down to a voltage at which the startup circuit unit 13 is required to be operated during the switching pause period in the standby mode, and it is possible to prevent the outputted voltage from decreasing excessively.

Furthermore, the isolated switch-mode power supply device 1 stops the operation of the startup circuit unit 13 during a time period until a time period determined based on the time constant of the time constant circuit 122 in FIG. 5 elapses after the switching element Q11 in FIG. 4 that is in the OFF state is turned to the ON state in the standby mode, as in the time period from time t4 to time t5 in FIG. 12, for example. Accordingly, it is possible to prevent the startup circuit unit 13 from unnecessarily operating, and the power consumption of the isolated switch-mode power supply device 1 in the standby mode can be further reduced.

In addition, the isolated switch-mode power supply device 1 fixes the threshold voltage used by the comparator CMP51 in FIG. 8 to the second threshold voltage during a time period until a time period determined based on the time constant of the time constant circuit 122 in FIG. 5 elapses after the switching element Q11 in FIG. 4 that is in the OFF state is turned to the ON state in the standby mode, as in the time period from time t4 to time t5 in FIG. 12, for example. Accordingly, as it is possible to immediately start the switching-control of the switching element Q1 in FIG. 1 without operating the startup circuit unit 13 even if the intermittent oscillation cycle is increased, the power consumption of the isolated switch-mode power supply device 1 can be further reduced. In other words, as it is possible to extend the time period in which the switching-control of the switching element Q1 in FIG. 1 can be immediately started without operating the startup circuit unit 13, the power consumption of the isolated switch-mode power supply device 1 can be further reduced.

The present application is based on Japanese Patent Application No. 2010-159483 filed in Japan by the applicant of the present application on Jul. 14, 2010, the entire content of which is incorporated herein by reference.

The present invention is not limited to the embodiment described above, and various modifications and applications can be made without departing from the spirit and the scope of the present invention.

For example, in the embodiment described above, the constant current supplying unit 14 in FIG. 7 supplies the constant current to the capacitor C4. However, the present invention is not limited to this example, and a current can be supplied to the capacitor C4. Supplying the current to the capacitor C4 can be realized by replacing at least one of the current sources S41 and S42 in FIG. 7 with a resistance, for example. It is possible to provide the same effect as described above even when at least one of the current sources S41 and S42 in FIG. 7 is replaced by a resistance.

Further, in the embodiment described above, the outputted-voltage upper-limit detecting unit 50 turns the phototransistor PT2 to the ON state if the outputted voltage $V_{OUT}$ is no lower than the upper limit voltage. The upper limit voltage can be set to the same voltage level both in the normal mode and the standby mode, or the upper limit voltage in the normal mode can be set to a different voltage level from that in the standby mode. For example, when the upper limit voltage is set to the same voltage level both in the normal mode and in the standby mode, the outputted voltage $V_{OUT}$ in the normal mode and a maximum value of the outputted voltage $V_{OUT}$ in the standby mode become identical. Further, when the upper limit voltage in the normal mode is set to a different voltage level from that in the standby mode, or more specifically, when the upper limit voltage in the normal mode is set to the same voltage level as the lower limit voltage in the standby mode, the outputted voltage $V_{OUT}$ in the normal mode and a minimum value of the outputted voltage $V_{OUT}$ in the standby mode become identical.

The invention claimed is:
1. An isolated switch-mode power supply device capable of controlling switching of a switching element in one of a continuous operation and a burst mode operation, and of controlling conversion of an inputted voltage into a required outputted voltage, the isolated switch-mode power supply device comprising:

a control power supply source configured to supply control power required for controlling the switching;

a first control unit having a current supplying unit for supplying a preliminarily determined current during at least a part of a time period in which power supply is received from the control power supply source, and configured to control the switching of the switching element in one of the continuous operation and the burst mode operation;

a control power supply switch configured to either connect or disconnect the first control unit and the control power supply source;

a capacitance element unit having a first capacitor to which the current is supplied from the current supplying unit, a capacitor charge voltage of the first capacitor changing according to an outputted voltage in the burst mode operation; and a second control unit configured to control the power supply to the first control unit by opening the control power supply switch during at least a part of a switching pause period in the burst mode operation according to the capacitor charge voltage of the first capacitor.

2. The isolated switch-mode power supply device according to claim 1, wherein the current supplying unit changes a value of the current to be supplied to the first capacitor according to the capacitor charge voltage of the first capacitor.

3. The isolated switch-mode power supply device according to claim 1, wherein when the capacitor charge voltage of the first capacitor is no lower than a second set voltage and the outputted voltage is no lower than an upper limit voltage, the first control unit stops the switching of the switching element.

4. The isolated switch-mode power supply device according to claim 1, wherein when the outputted voltage becomes no lower than upper limit voltage during the time period in which the power supply from the control power supply source to the first control unit is performed, the current supplying unit starts supplying the current to the first capacitor, and when the capacitor charge voltage of the first capacitor is no lower than a second set voltage and the outputted voltage is no lower than the upper limit voltage, the first control unit stops the switching of the switching element.

5. The isolated switch-mode power supply device according to claim 1, wherein the second control unit includes the capacitance element unit, the capacitance element unit includes the first capacitor, a first switching element, and a second switching element, one end of the first capacitor is connected to a control terminal of the first switching element, the other end of the first capacitor is connected to an output terminal of the first switching element, and to an output terminal of the second switching element, an input terminal of the first switching element is connected to a control terminal of the second switching element, and to the control power supply source via a driving unit for driving the second switching element, and an input terminal of the second switching element is connected to a control terminal of the control power supply switch.

6. The isolated switch-mode power supply device according to claim 1, further comprising: first discharge means configured to decrease the capacitor charge voltage of the first capacitor when the outputted voltage becomes no higher than a lower limit voltage.

7. The isolated switch-mode power supply device according to claim 6, wherein when a state switching signal for shifting the state to the continuous operation is inputted, the first discharge means decreases the capacitor charge voltage of the first capacitor.

8. The isolated switch-mode power supply device according to claim 1, further comprising: a second capacitor configured to be charged during the switching pause period in the burst mode operation, wherein based on a capacitor charge voltage of the second capacitor, a case in which supply of the inputted voltage is started is discriminated from a case in which the power supply from the control power supply source to the first control unit is resumed in the burst mode operation.

9. The isolated switch-mode power supply device according to claim 1, further comprising: second discharge means connected in parallel to the first capacitor.

10. The isolated switch-mode power supply device according to claim 1, wherein when the capacitor charge voltage of the first capacitor becomes no lower than a first set voltage, the second control unit opens the control power supply switch.

11. The isolated switch-mode power supply device according to claim 3, further comprising: a startup circuit configured to activate the first control unit and the second control unit by the inputted voltage, wherein when the capacitor charge voltage of the first capacitor becomes no lower than the second set voltage, an operation of the startup circuit is prohibited.

12. The isolated switch-mode power supply device according to claim 11, wherein when the capacitor charge voltage of the first capacitor becomes lower than the second set voltage, the prohibition of the operation of the startup circuit is lifted and the control power supply switch is closed by the second control unit.

13. The isolated switch-mode power supply device according to claim 11, wherein during a specific time period in the burst mode operation, the operation of the startup circuit is stopped, the specific time period being a time period until a first time period elapses after closing the control power supply switch in an open state.

14. The isolated switch-mode power supply device according to claim 13, further comprising: a specific control unit configured to, when the control voltage supplied to the first control unit is no lower than a first threshold voltage, stop the operation of the startup circuit and start controlling the switching of the switching element, and to, when the control voltage is no higher than a second threshold voltage that is lower than the first threshold voltage, start the operation of the startup circuit and stop controlling the switching of the switching element, wherein during the specific time period in the burst mode operation, a threshold voltage used by the specific control unit is fixed to the second threshold voltage.

15. An isolated switch-mode power supply device capable of controlling switching of a switching element in one of a continuous operation and a burst mode operation, and of controlling conversion of an inputted voltage into a required outputted voltage, the isolated switch-mode power supply device comprising:

a control power supply source configured to supply control power required for controlling the switching;

a first control unit having a constant current supplying unit for supplying a preliminarily determined constant current during at least a part of a time period in which power supply is received from the control power supply source, and configured to control the switching of the switching element in one of the continuous operation and the burst mode operation;

a control power supply switch configured to either connect or disconnect the first control unit and the control power supply source;

a capacitance element unit having a first capacitor to which the constant current is supplied from the constant current supplying unit, a capacitor charge voltage of the first capacitor changing according to an outputted voltage in the burst mode operation; and a second control unit configured to control the power supply to the first control unit by opening the control power supply switch during at least a part of a switching pause period in the burst mode operation according to the capacitor charge voltage of the first capacitor.

16. The isolated switch-mode power supply device according to claim 15, wherein the constant current supplying unit changes a value of the constant current to be supplied to the first capacitor according to the capacitor charge voltage of the first capacitor.

17. The isolated switch-mode power supply device according to claim 15, wherein when the capacitor charge voltage of the first capacitor is no lower than a second set voltage and the outputted voltage is no lower than an upper limit voltage, the first control unit stops the switching of the switching element.

18. The isolated switch-mode power supply device according to claim 15, wherein when the outputted voltage becomes no lower than upper limit voltage during the time period in which the power supply from the control power supply source to the first control unit is performed, the constant current supplying unit starts supplying the constant current to the first capacitor, and when the capacitor charge voltage of the first capacitor is no lower than a second set voltage and the outputted voltage is no lower than the upper limit voltage, the first control unit stops the switching of the switching element.

* * * * *